United States Patent
Amemiya et al.

(10) Patent No.: US 7,877,729 B2
(45) Date of Patent: Jan. 25, 2011

(54) METHOD AND APPARATUS FOR EDITING AND VIEWING DEVICE LAYOUT, AND COMPUTER PROGRAM PRODUCT

(75) Inventors: Kanae Amemiya, Tokyo (JP); Shuuichi Takeda, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1012 days.

(21) Appl. No.: 11/520,631

(22) Filed: Sep. 14, 2006

(65) Prior Publication Data
US 2007/0067757 A1 Mar. 22, 2007

(30) Foreign Application Priority Data

| Sep. 16, 2005 | (JP) | ............................ 2005-271053 |
| Sep. 16, 2005 | (JP) | ............................ 2005-271054 |
| Aug. 10, 2006 | (JP) | ............................ 2006-218673 |
| Aug. 10, 2006 | (JP) | ............................ 2006-218674 |

(51) Int. Cl.
*G06F 9/44* (2006.01)
*G06F 17/00* (2006.01)
(52) U.S. Cl. ..................... 717/113; 717/104; 717/109; 715/223; 715/224; 715/221
(58) Field of Classification Search ................. 717/113
See application file for complete search history.

(56) References Cited

U.S. PATENT DOCUMENTS

| 5,793,974 | A | * | 8/1998 | Messinger | ................... 709/224 |
| 5,794,006 | A | * | 8/1998 | Sanderman | ................... 709/223 |
| 5,910,803 | A | * | 6/1999 | Grau et al. | ................... 715/734 |
| 6,425,007 | B1 | * | 7/2002 | Messinger | ................... 709/224 |
| 6,941,359 | B1 | * | 9/2005 | Beaudoin et al. | ............. 709/221 |
| 7,366,980 | B2 | * | 4/2008 | Small | ......................... 715/248 |
| 7,401,289 | B2 | * | 7/2008 | Lachhwani et al. | ......... 715/243 |
| 7,468,805 | B2 | * | 12/2008 | Lo et al. | .................... 358/1.18 |
| 2002/0052941 | A1 | * | 5/2002 | Patterson | ................... 709/223 |
| 2005/0144271 | A1 | * | 6/2005 | Shirane et al. | .............. 709/223 |
| 2005/0165922 | A1 | * | 7/2005 | Hatano | ....................... 709/223 |

FOREIGN PATENT DOCUMENTS

| JP | 2005-004482 | 1/2005 |
| JP | 2005-038045 | 2/2005 |

OTHER PUBLICATIONS

NetSpot Console; http://cweb.canon.jp/drv-upd/netspotsuite/console/wincon.html, dated Aug. 29, 2006.
Web JetAdmin Software; http://h50221.www5.hp.com/CPO TC/printer/wjet/sw wjet.html, dated Aug. 29, 2006.

* cited by examiner

*Primary Examiner*—Thomas K Pham
(74) *Attorney, Agent, or Firm*—Harness, Dickey & Pierce, P.L.C.

(57) ABSTRACT

A receiving unit receives a device icon of an input/output device and device layout data including positional information of the device icon from a device-layout managing apparatus. A viewing unit displays a device layout diagram including a device list area and a map area, based on the received device icon and device layout data. An editing unit edits the device layout diagram based on a shift operation received by an input unit from a use, and generates the device layout data including the positional information of the device icon after a shift. A transmitting unit transmits the generated device layout data to the device-layout managing apparatus.

18 Claims, 23 Drawing Sheets

FIG.4
| DEVICE ICON | | DEVICE RELATED DATA |
|---|---|---|
| ICON FILE NAME | ICON IMAGE | |
| iconPinter80.jpg |  | IN-HOUSE (MONOCHROME) PRINTER P-PRT01 |
| iconMFP80.jpg |  | IN-HOUSE (MONOCHROME) MFP R-MFP02 |
| iconPinterC80.jpg |  | IN-HOUSE (COLOR) PRINTER R-PRT03 |
| iconMFPC80.jpg |  | IN-HOUSE (COLOR) MFP R-MFP04 |
| iconPinterX80.jpg |  | MONOCHROME/UNKNOWN PRINTER A-PRT BY COMPANY A |
| iconPinterXC80.jpg |  | COLOR PRINTER B-PRT BY COMPANY B |
| ... | ... | ... |
206

FIG.5

| MAP NAME | map1.jpg |
| --- | --- |
| ICON SIZE | 100 |
| MAP TRANSPARENCY | 50 |
| ICON TRANSPARENCY | 50 |
| MODE | USER |

| AREA | PRINTER NAME | IP ADDRESS | IMAGE TYPE | X COORDINATE | Y COORDINATE | ARROW ANGLE OF ICON | ARROW LENGTH OF ICON | FRAME COLOR OF ICON | BLINK | SYSTEM STATE DISPLAY | PRINTER STATE DISPLAY | COPY STATE DISPLAY | FAX STATE DISPLAY | SCANNER STATE DISPLAY |
| --- | --- | --- | --- | --- | --- | --- | --- | --- | --- | --- | --- | --- | --- | --- |
| MAP | R-MFP04 | 133.139.168.1 | IN-HOUSE (COLOR) MFP | -200 | 150 | -100 | 180 | YELLOW | | CHANGE | NO TONER | NO TONER | Operational | Operatonal |
| DEVICE LIST | R-PRT01 | 133.139.168.233 | IN-HOUSE (MONOCHROME) PRT | 40 | 10 | -80 | 80 | YELLOW | | | | | | |
| DEVICE LIST | R-PRT03 | 133.139.168.241 | IN-HOUSE (COLOR) PRT | 80 | 100 | -100 | 60 | BLUE | | | | | | |
| DEVICE LIST | A-PRT | 133.139.168.52 | PRT OF COMPANY A | 40 | 10 | -80 | 80 | NONE | | | | | | |
| DEVICE LIST | B-PRT | 133.139.168.159 | PRT OF COMPANY B | 80 | 100 | -100 | 60 | RED | | | | | | |
| MAP | R-PRT01 | 133.139.168.25 | IN-HOUSE (MONOCHROME) PRT | 0 | 0 | 10 | 200 | RED | | | | | | |
| MAP | A-PRT | 133.139.168.6 | PRT OF COMPANY A | 80 | -80 | 45 | 100 | RED | | | | | | |
| MAP | R-MFP02 | 133.139.168.1 | IN-HOUSE (MONOCHROME) MFP | 80 | -130 | -100 | 60 | BLUE | | CHANGE | NO TONER | | | |
| DEVICE LIST | R-PRT01 | 133.139.168.233 | IN-HOUSE (MONOCHROME) PRT | 40 | 10 | -80 | 80 | RED | | | | | | |
| DEVICE LIST | R-MFP02 | 133.139.168.241 | IN-HOUSE (MONOCHROME) MFP | 80 | 100 | -100 | 60 | NONE | | | | | | |
| DEVICE LIST | R-PRT03 | 133.139.168.52 | IN-HOUSE (COLOR) RPT | 40 | 10 | -80 | 80 | NONE | | | | | | |
| DEVICE LIST | R-PRT03 | 133.139.168.159 | IN-HOUSE (COLOR) RPT | 80 | 100 | -100 | 60 | RED | | | | | | |
| MAP | R-MFP04 | 133.139.168.25 | IN-HOUSE (COLOR) MFP | 85 | -30 | 10 | 200 | RED | BLINK | CHANGE | NO TONER | NO TONER | OPERATIONAL | OPERATIONAL |

FIG.6

IN-HOUSE (MONOCHROME)
PRINTER  R-PRT01
192.168.100.1

IN-HOUSE (MONOCHROME)
MFP  R-MFP02
192.168.120.2

IN-HOUSE (COLOR) PRINTER
R-PRT03
192.168.131.10

IN-HOUSE (COLOR)  R-MFP04
192.168.100.10

MONOCHROME/UNKNOWN
PRINTER A-PRT BY COMPANY A
192.168.120.15

COLOR PRINTER B-PRT BY
COMPANY B
192.168.131.20

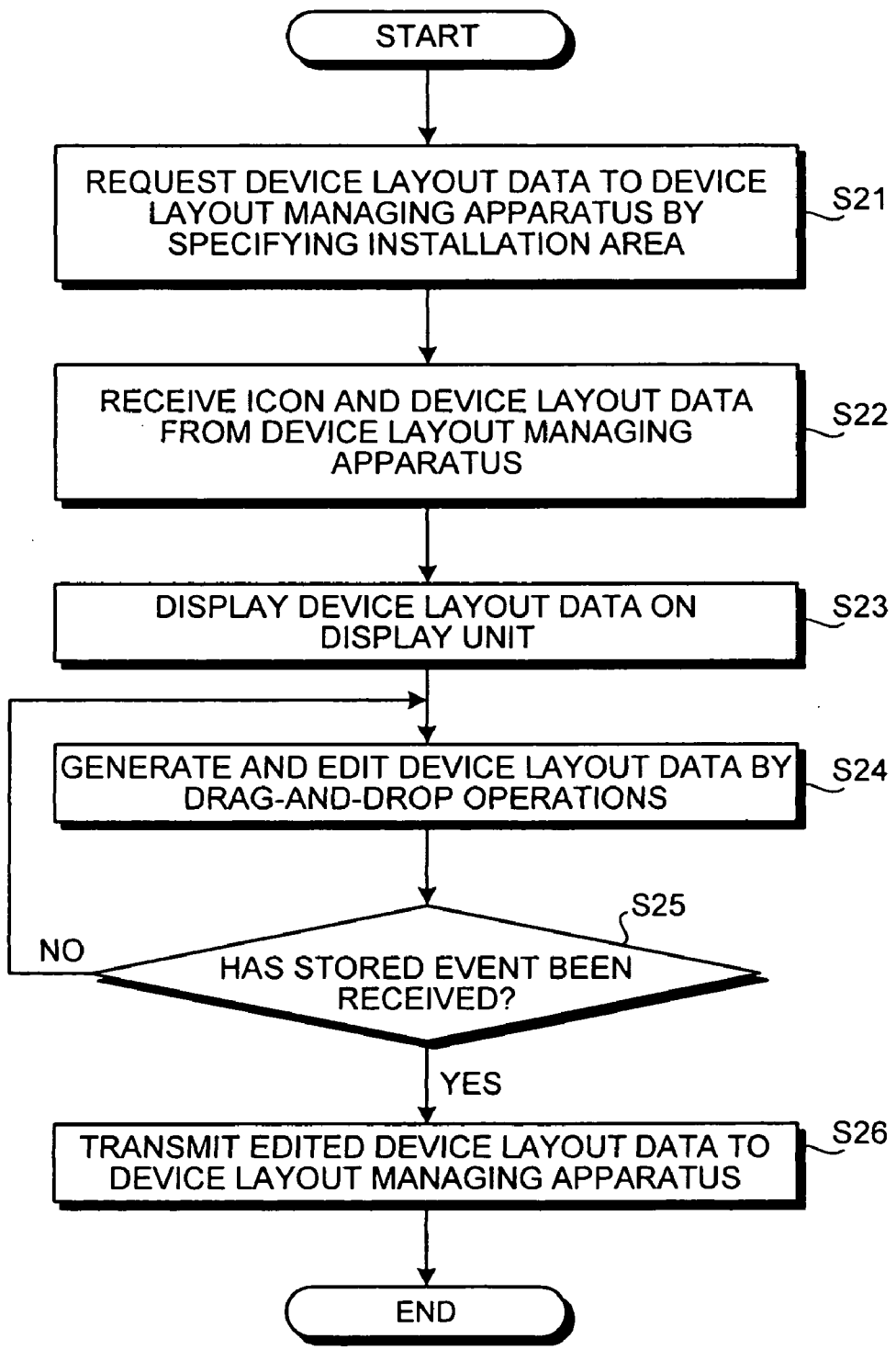

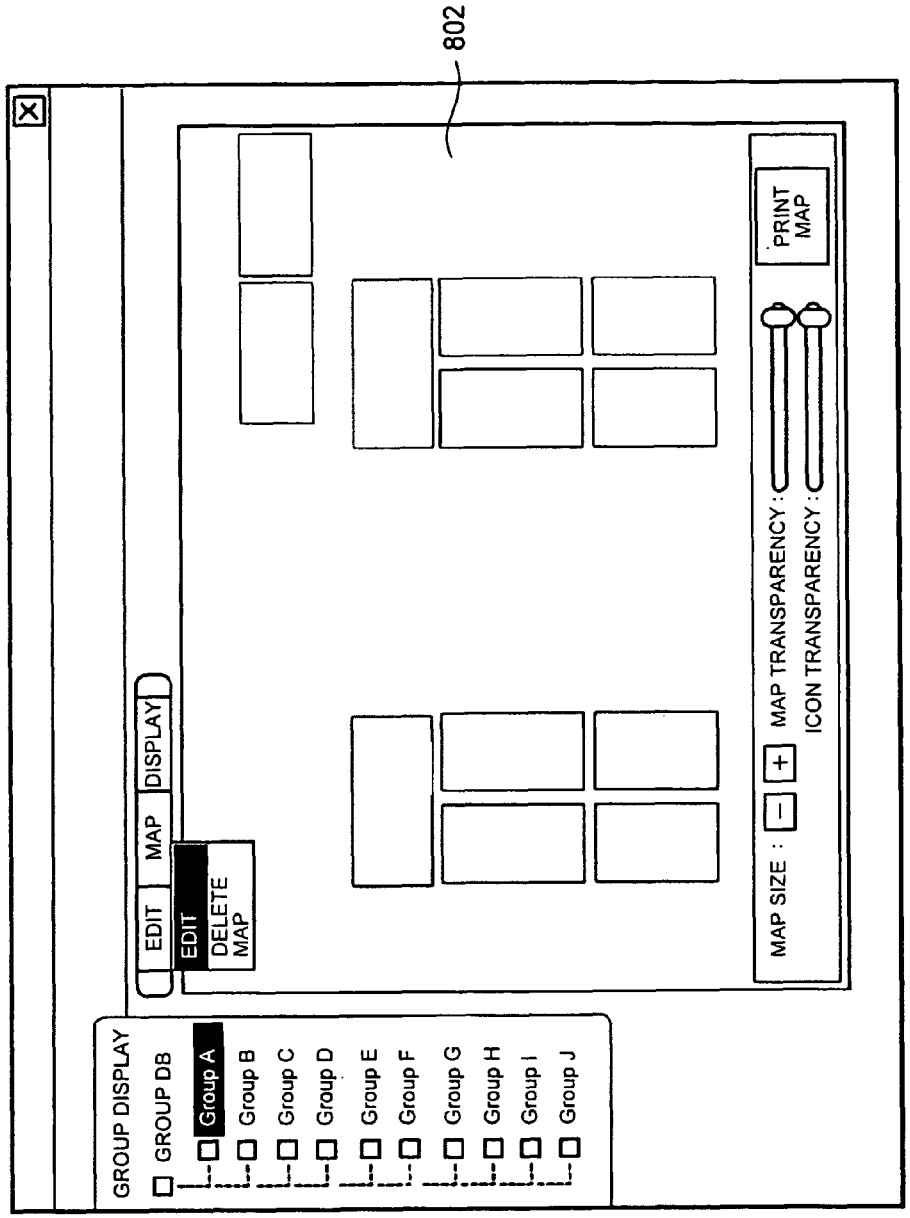

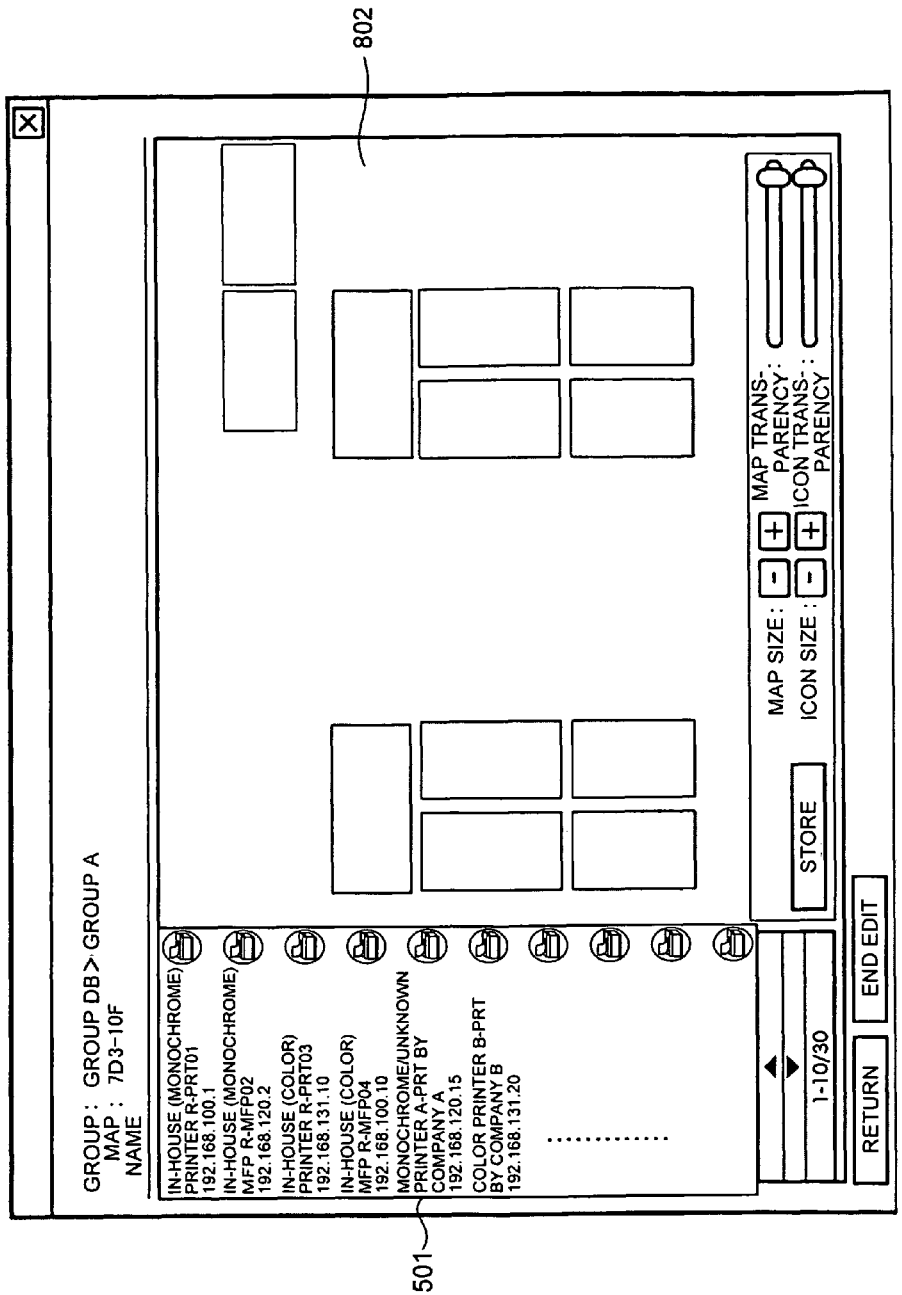

METHOD AND APPARATUS FOR EDITING AND VIEWING DEVICE LAYOUT, AND COMPUTER PROGRAM PRODUCT

CROSS-REFERENCE TO RELATED APPLICATIONS

The present document incorporates by reference the entire contents of Japanese priority documents, 2005-271053 and 2005-271054 filed in Japan on Sep. 16, 2005, and 2006-218673 and 2006-218674 filed in Japan on Aug. 10, 2006.

BACKGROUND OF THE INVENTION

1. Field of the Invention

The present invention relates to a method, an apparatus, and a computer program product for generating, editing, and viewing a device layout diagram that displays an arrangement position in an installation area of an input/output device connected to a network.

2. Description of the Related Art

Conventionally, there are device layout generation systems for generating a device layout map (a device layout diagram) in which an arrangement position in an installation area of an input/output device such as a printer and a multifunction product (MFP) connected to the network is displayed. For example, such a device layout generation system is known from a first conventional art (disclosed by "NetSpot Console" in http://cweb.canon.jp/drv-upd/netspotsuite/console/wincon.html) and a second conventional art (disclosed by "Web JetAdmin Software [Japanese version]" and "Web JetAdmin Software [English version]" in http://h50221.www5.hp.com/CPO_TC/printer/wjet/sw_wjet.html).

In these conventional arts, a device layout map, in which the input/output device corresponding to a device icon is arranged at a position where the device icon is arranged, is generated by arranging the device icon indicating the input/output device on a screen displaying the installation area such as a floor.

FIGS. 18A to 18D depict display screens displayed by a device layout map generating process in the device layout generation system according to the first conventional art. In the first conventional art, as shown in FIG. 18A, a layout map in an installation area 2202, for which a device layout is to be generated, is displayed on a screen. When an optional icon from device icon groups 2201 in the upper part of the screen shown in FIG. 18A is moved to an optional position in the installation area 2202, as shown in FIG. 18B, a pop-up screen 2203 is displayed, and a selection screen for selecting a desired input/output device from a plurality of input/output devices are displayed on the pop-up screen 2203. On this selection screen, a device name of the input/output device, a product name, a network address, and an installation site are displayed for each input/output device. When a user selects an input/output device to be arranged in the layout map of the installation area from the input/output devices displayed on the selection screen, as shown in FIG. 18C, a device icon is arranged at a position on the installation area 2202 corresponding to the installation site of the selected input/output device, and the device name is added to the device icon and displayed. When a plurality of input/output devices are set closely in one place, as shown in FIG. 18D, a plurality of device icons are arranged in the same place and displayed.

FIGS. 19A to 19D depict a display screen displayed by a device layout map generation process in the device layout generation system as the second conventional art. In the second conventional art, as shown in FIG. 19A, a layout map of an installation area 2302 whose device layout is to be created is displayed on the screen, and on this screen, when an EDIT MAP button is clicked, an edit screen of the device layout map shown in FIG. 19B is displayed. The installation area 2302 in the device layout map is divided by grid lines, and a device icon can be arranged only in a unit of grid. A user selects "ADD" in Edit Option and "Device" in Item Option on the edit screen. When the user selects an input/output device to be arranged in the device layout map, by referring to an input/output MAC address obtained beforehand, and selects a grid corresponding to the installation site in the installation area 2302, a device icon is arranged in the selected grid, as shown in FIG. 19C. When a plurality of input/output devices are set closely in one place, as shown in FIG. 19D, a plurality of device icons are arranged in grids near the installation area.

However, the device layout generation systems according to the conventional arts have following problems.

In the first conventional art, an optional icon is selected first from the device icon group 2201. However, after the device icon is shifted to the layout map of the installation area 2202, an input/output device to be arranged is selected from a device list on the selection screen in FIG. 18B, and hence the device icon only acts as a trigger of selection of the input/output device. In other words, in the first conventional art, a shift operation of the device icon onto the layout map of the installation area is not associated with an arrangement of the device icon, and hence when the user performs the device layout map generation operation, the operation of the device icon can be confusing.

Furthermore, since the input/output device is selected after the device icon is shifted onto the layout map of the installation area, respective device icons in the device icon group 2201 in FIG. 18A are not allocated to actual input/output devices. Therefore, at the time of selecting the device icon in the device layout map generation, an input/output device of the company cannot be distinguished from input/output devices of other companies by the device icon, or the device icon cannot be selected based on advanced knowledge of functional information as to whether it is color or monochrome. Therefore, the user's operation becomes complicated, and it can be confusing.

When a plurality of input/output devices are set closely in one place, as shown in FIG. 18D, a plurality of device icons are overlapped and displayed in the same place. Accordingly, the user cannot ascertain the device information attached to respectively arranged device icons, thereby complicating a generating and editing operation and a display operation of the device layout map by the user.

On the other hand, in the second conventional art, since the device icon can be only arranged in the grid on the layout map of the installation area, there is no sufficient flexibility in an arrangement of device icons. Further, since the device icon is arranged in the grid, even when a plurality of input/output devices are set closely in one place, as shown in FIG. 19D, the device layout map does not show a closely set state in one place. Therefore, the arrangement of the device icons is different from the actual arrangement of the input/output devices, thereby making the device layout map inaccurate.

SUMMARY OF THE INVENTION

It is an object of the present invention to at least partially solve the problems in the conventional technology.

An apparatus for editing and viewing a device-layout, according to one aspect of the present invention, includes a display unit that displays various data; a receiving unit that receives, from a device-layout managing apparatus connected to a network, a device icon of an input/output device connected to the network and device layout data including positional information of the device icon; a viewing unit that displays a device layout diagram including a device list area in which the device icon is displayed in correspondence with information specific to the input/output device and a map area indicating an installation area of the input/output device on the display unit, based on the received device icon and the received device layout data; an input unit that receives a shift operation of the device icon on the device layout diagram from a user; an editing unit that edits the device layout diagram by specifying a position of the device icon based on the received shift operation, and generates the device layout data including the positional information of the device icon after a shift from the edited device layout diagram; and a transmitting unit that transmits the generated device layout data to the device-layout managing apparatus.

A method of editing and viewing a device-layout, according to another aspect of the present invention, includes receiving, from a device-layout managing apparatus connected to a network, a device icon of an input/output device connected to the network and device layout data including positional information of the device icon; displaying a device layout diagram including a device list area in which the device icon is displayed in correspondence with information specific to the input/output device and a map area indicating an installation area of the input/output device on a display unit, based on the received device icon and the received device layout data; receiving a shift operation of the device icon on the device layout diagram from a user; editing the device layout diagram by specifying a position of the device icon based on the received shift operation; generating the device layout data including the positional information of the device icon after a shift from the edited device layout diagram; and transmitting the generated device layout data to the device-layout managing apparatus.

A computer program product according to still another aspect of the present invention includes a computer usable medium having computer readable program codes embodied in the medium that when executed causes a computer to execute receiving, from a device-layout managing apparatus connected to a network, a device icon of an input/output device connected to the network and device layout data including positional information of the device icon; displaying a device layout diagram including a device list area in which the device icon is displayed in correspondence with information specific to the input/output device and a map area indicating an installation area of the input/output device on a display unit, based on the received device icon and the received device layout data; receiving a shift operation of the device icon on the device layout diagram from a user; editing the device layout diagram by specifying a position of the device icon based on the received shift operation; generating the device layout data including the positional information of the device icon after a shift from the edited device layout diagram; and transmitting the generated device layout data to the device-layout managing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an explanatory diagram of one example of an icon-management database;

FIG. 5 is an explanatory diagram of device layout data;

FIG. 6 is one example of a device list area;

FIG. 7B is a flowchart of a device-layout editing/viewing procedure performed by the device-layout editing/viewing apparatus according to the first embodiment;

FIG. 8 is one example of a screen of a map area displayed on a display screen of a display unit, when a device layout is generated;

FIG. 9 is one example of a state where a device layout area and a map area are displayed;

DETAILED DESCRIPTION OF THE PREFERRED EMBODIMENTS

Exemplary embodiments of the present invention will be explained below in detail with reference to the accompanying drawings.

Figure 1:
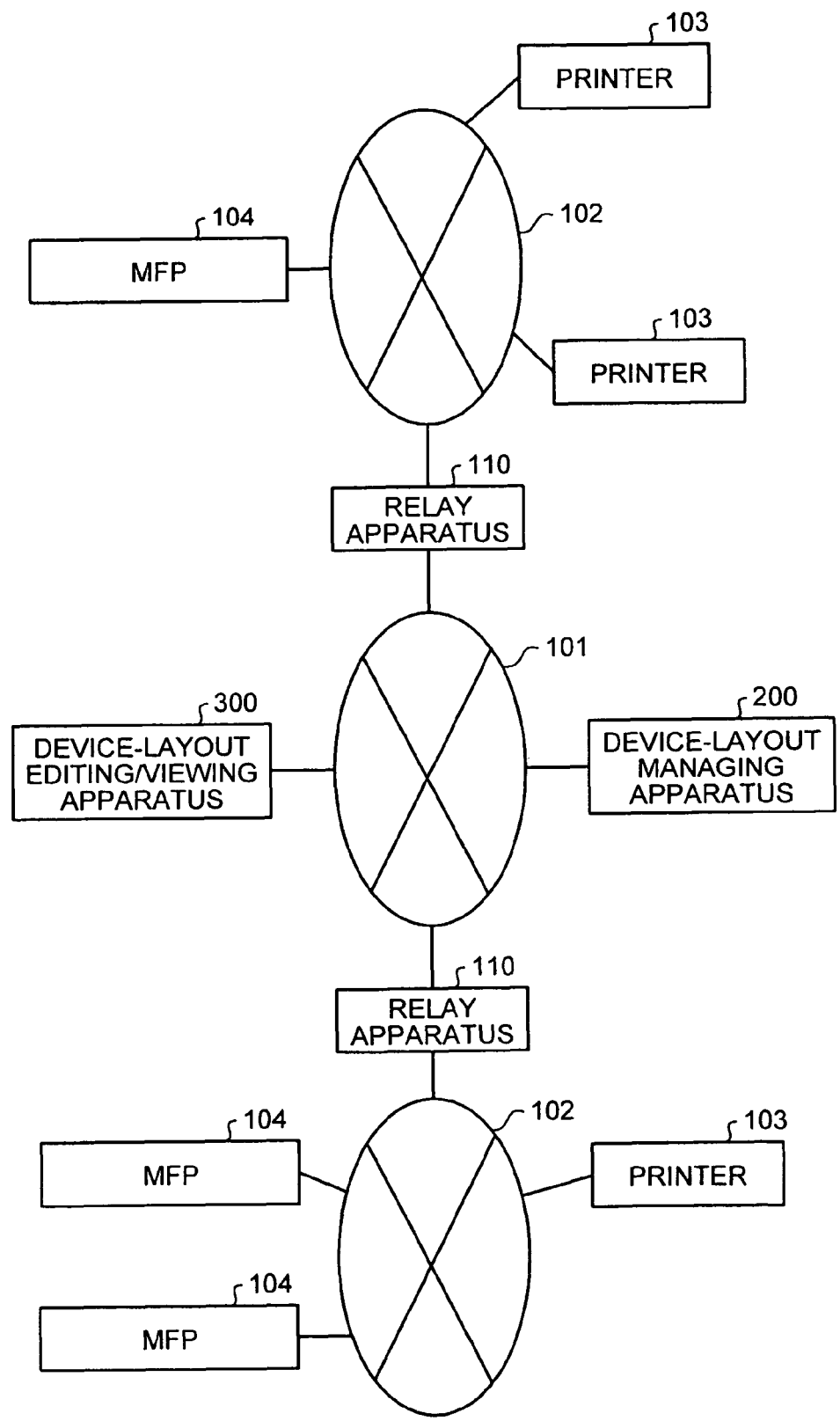
FIG. 1 is a network configuration diagram of a device layout editing/viewing system according to a first embodiment of the present invention.

FIG. 1 is a network configuration diagram of a device layout editing/viewing system according to a first embodiment of the present invention. As shown in FIG. 1, in the device layout editing/viewing system according to the first embodiment, a device-layout editing/viewing apparatus 300 and a device-layout managing apparatus 200 are connected to a network 101 such as the Internet.

The device-layout managing apparatus 200 is a server apparatus that generates and stores a device layout diagram, and generates the device layout diagram according to a request from the device-layout editing/viewing apparatus 300, and transmits the diagram to the device-layout editing/viewing apparatus 300. The device layout diagram represents image data and the like indicating an arrangement position in an installation area of the input/output device connected to a network 102, and image data of a map displayed from the device layout data in an extended markup language (XML) format.

The device-layout editing/viewing apparatus 300 becomes a client of the device-layout managing apparatus 200, and makes a request of the device layout diagram to the device-layout managing apparatus 200, to display, edit, and input the device layout diagram.

The network 102 such as a local area network (LAN), to which a plurality of printers 103 and MFPs 104 are connected, is connected to the network 101 via a relay apparatus 110 such as a router or a gateway. While the networks 102 respectively are connected to the network 101 via the relay apparatus 110 in FIG. 1, such a network configuration is only one example, and optional number of networks can be connected to the network 102. The relay apparatus 110 is, for example, the router or the gateway.

In FIG. 1, each of the MFPs 104 and the printers 103 on the network holds a management information base (MIB), which is an item managed by a simple network management protocol (SNMP). Device related data of the own device and data specific to the device are registered in the MIB.

The data specific to the device includes a MAC address and the like, which is specific to the own device (the printer 103, the MFP 104, or the like).

The device related data includes functional information of the own device (the printer 103, the MFP 104, or the like) and manufacturer data, and in the first embodiment, functional information whether it is color or monochrome of respective input/output device, a manufacturer, and a model name, are used as the device related data.

Figure 2:
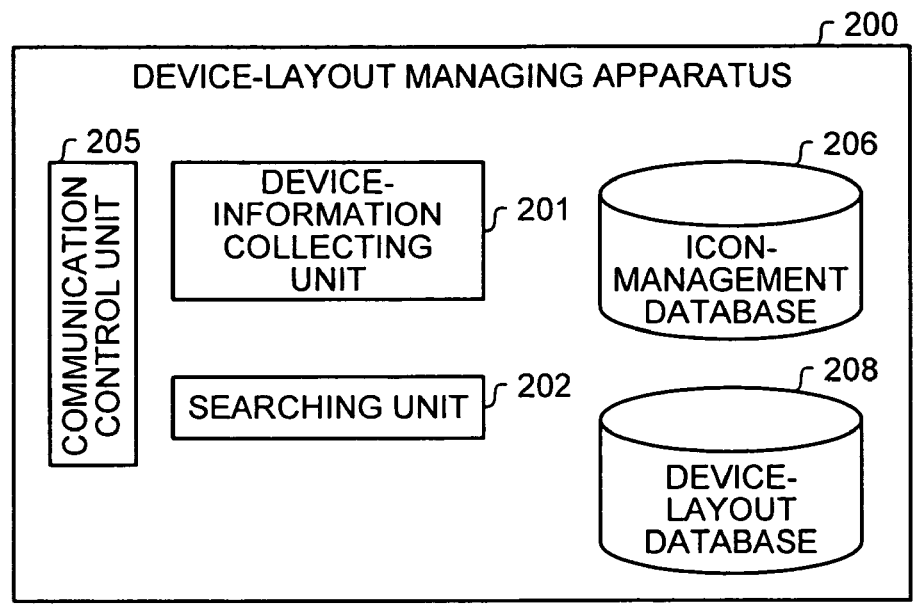
FIG. 2 is a block diagram of a functional configuration of a device-layout managing apparatus according to the first embodiment.

The device-layout managing apparatus 200 is explained next in detail. FIG. 2 is a block diagram of a functional configuration of the device-layout managing apparatus 200 according to the first embodiment. As shown in FIG. 2, the device-layout managing apparatus 200 includes a device-information collecting unit 201, a searching unit 202, a communication control unit 205, a device-layout database 208, and an icon-management database 206.

The device-information collecting unit 201 requests the MIB information to the device (the printer 103, the MFP 104, and the like) connected to the network 102, and receives information specific to the device (the MAC address) and the device related data (functional information such as whether it is a printer or an MFP, whether it is color or monochrome, and a manufacturer).

The searching unit 202 searches for a device icon corresponding to the device related data from the icon-management database 206, using the device related data (the function of the printer, the MFP, and the like, and the manufacturer) of the printer 103, the MFP 104 and the like collected by the device-information collecting unit 201 as a key. The device icon is an icon of the input/output device such as the printer 103, the MFP 104, and the like. The icon refers to an image or a symbol expressing various data and processing functions on a display screen. While in the first embodiment, a device icon of the input/output device is displayed on the display screen, the present invention is not limited thereto. A symbol including the icon and a sign or character string expressing various data and processing functions can be displayed.

The communication control unit 205 controls transfer of data between the device-layout editing/viewing apparatus 300 and the device-layout managing apparatus 200 via the network 101.

The icon-management database 206 stores a device icon and device related data in correspondence with each other for each input/output device such as the printer 103 and the MFP 104. FIG. 4 is one example of the icon-management database 206. As shown in FIG. 4, in the icon-management database 206, an icon file name and an icon image as the device icon, and a manufacturer, information whether it is monochrome or color, whether it is a printer or an MFP, and a printer name as the device related data are registered for each input/output device. The manufacturer and information as to whether it is monochrome or color and whether it is a printer or an MFP in the device related data are registered in image type of the device layout data. Further, the user registers a printer name of the device-layout data based on the model name of the device related data. The icon-management database 206 is stored in a storage medium such as a hard disk drive (HDD).

In the device-layout database 208, the device layout data generated by the device-layout editing/viewing apparatus 300 is registered for each installation area. The device layout data is XML format data, and information such as a map area in the layout of an area in which the device icon is to be arranged, that is, an area in which the input/output device is to be installed, and the position of the device icon in a device list area for displaying a list of device icons is described therein for each installation area. A device layout diagram, which is a map image, is displayed from the XML format device layout data on a display unit. In the installation area, the input/output device (a printer and an MFP) as a display target in the device layout diagram is installed.

FIG. 5 is one example of the content of the device layout data. In FIG. 5, while the device layout data is indicated in a table format, it is described in the XML format in practice.

In the device layout data, as shown in FIG. 5, a map name of the device layout diagram, an icon size, map transparency, icon transparency, and a mode (user mode or not) are set. An area to be displayed (a device list area or a map area), a printer name, an IP address of the printer, an image type of the icon, position coordinate of the icon on the map (X coordinate, Y coordinate), the arrow angle of the icon, the arrow length of the icon, a frame color of icon, whether to blink the icon, system state display, copy state display, FAX state display, and scanner state display are further set for each printer to be displayed in the device layout diagram. These settings are determined by the device-layout editing/viewing apparatus 300 by the operation such as arranging the icon in the device layout diagram displayed on the display unit, and at the time of storing the device layout diagram, converted to the XML format device layout data. The device layout data is transmitted from the device-layout editing/viewing apparatus 300 to the device-layout managing apparatus 200.

On the other hand, when the device layout data is displayed by the device-layout editing/viewing apparatus 300, it is displayed as a display layout diagram including the device list area and the map area.

The icon-management database 206 and the device-layout database 208 are stored in a recording medium such as the HDD.

Figure 3:
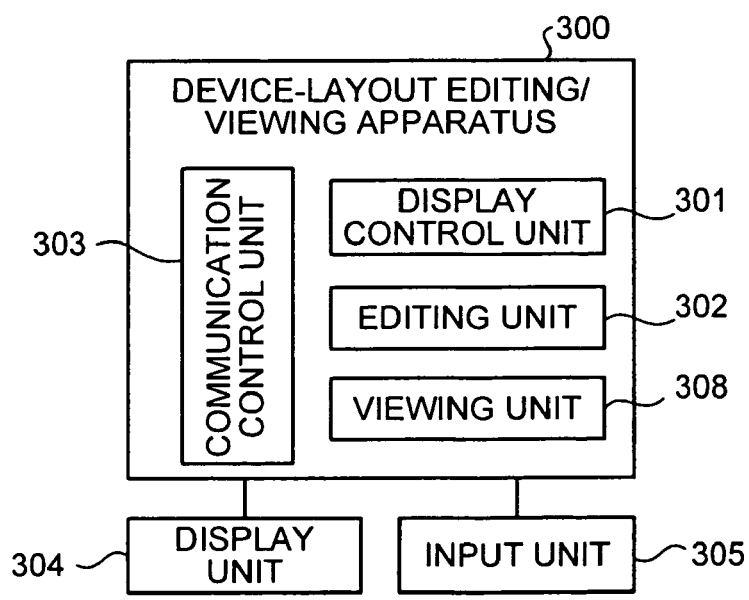
FIG. 3 is a block diagram of a functional configuration of a device-layout editing/viewing apparatus according to the first embodiment.

The device-layout editing/viewing apparatus according to the first embodiment is explained next. FIG. 3 is a block diagram of a functional configuration of the device-layout editing/viewing apparatus according to the first embodiment. As shown in FIG. 3, the device-layout editing/viewing apparatus 300 includes a display control unit 301, an editing unit 302, a communication control unit 303, a viewing unit 308, a display unit 304 such as a display unit, and an input unit 305 such as a pointing device, for example, as a mouse and a keyboard.

The display control unit 301 controls display of various data such as the device layout data on the display unit 304, and is specifically a display driver.

The editing unit 302 displays the device icon received from the device-layout managing apparatus 200 and a device layout diagram from the device layout data in the device list area to enable editing. The editing unit 302 receives from the input unit the user's drag-and-drop operations for moving the device icon in the device list area of the device layout diagram displayed on the display unit 304 to the map area, and specifies the arrangement of the device icon.

Furthermore, the editing unit 302 performs an editing process for deleting the device icon by receiving an operation for returning the device icon arranged in the map area to the original position in the device list area by the drag-and-drop operations from the input unit 305. Also performed are an editing process for enlarging and reducing the device icon by receiving an operation for enlarging and reducing the device icon arranged on the map area at an optional magnification specified by the user from the input unit 305, an editing process for editing the device icon in a specified balloon shape by receiving an operation for deforming the device icon arranged in the map area layout into a balloon shape extending from the actual arrangement position by a mouse or the like, and an enlarging/reducing process of the size of the map area.

Specifically, the editing unit 302 manages the XML format device-layout data based on the software Flash technology (Flash technology) developed by Adobe®, and displays the device layout data on the display unit 304 as the device layout diagram so as to be able to edit. Accordingly, for the device layout diagram displayed from the device layout data, various viewing functions such as enlarging and reducing of the icon and the map area, entire screen display of the map area, the transparency of the icon and the map area, and printing of the map area in the device layout diagram can be achieved by the function of the Flash technology.

The drag-and-drop operations refer to an operation method of the mouse and the like for continuously performing drag and drop. An operation for shifting a pointer while holding down a button of a mouse or the like is referred to as "drag", and an operation for releasing the button of the mouse or the like at the dragging destination is referred to as "drop".

The viewing unit 308 is a processor that displays the device layout data received from the device-layout managing apparatus 200 on the display unit 304 via the display control unit 301. Specifically, the viewing unit 308 manages the XML format device-layout data based on the software Flash technology (Flash technology) developed by Adobe®, and displays the device layout data on the display unit 304 as the device layout diagram. Accordingly, for the device layout diagram displayed from the device layout data, various viewing functions such as enlarging and reducing of the icon and the map area, entire screen display of the map area, the transparency of the icon and the map area, and printing of the map area in the device layout diagram can be achieved by the function of the Flash technology.

The device list area when the device layout data is displayed as the device layout diagram is explained. FIG. 6 is one example of the device list area. As shown in FIG. 6, an IP address, such as "192.168.100.1", is displayed in correspondence with each device icon in the device list area.

Furthermore, internally, respective device icons are associated with the MAC address, which is the data specific to the device, by the editing unit 302. The IP address corresponding to each device can be obtained by referring to the address database in which the IP address of the device on the network is stored in correspondence with a model name and a MAC address.

Figure 18A:
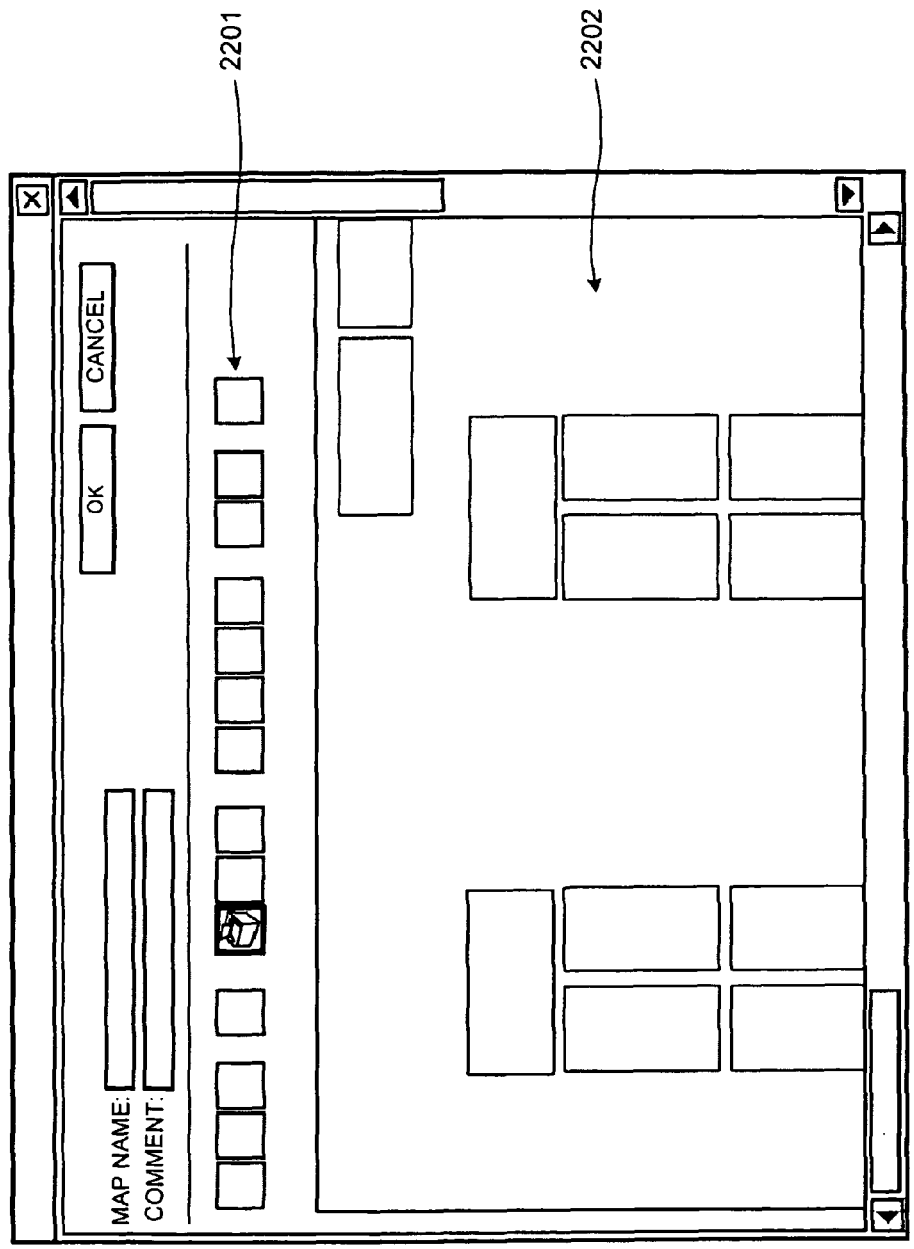
FIGS. 18A to 18D depict a display screen displayed in a device layout map generating process in a device layout generation system according to a first conventional art.
Figure 18B:
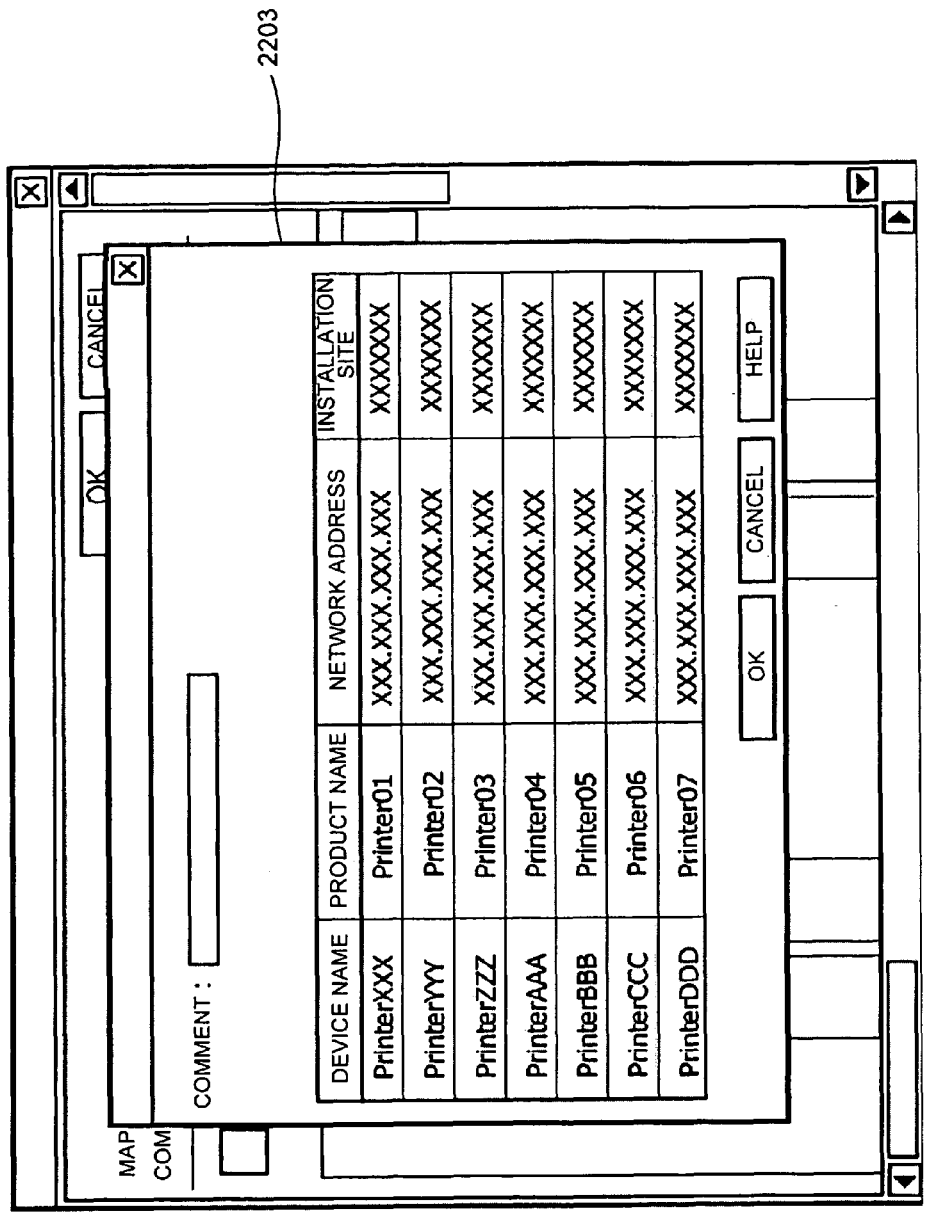
Figure 18C:
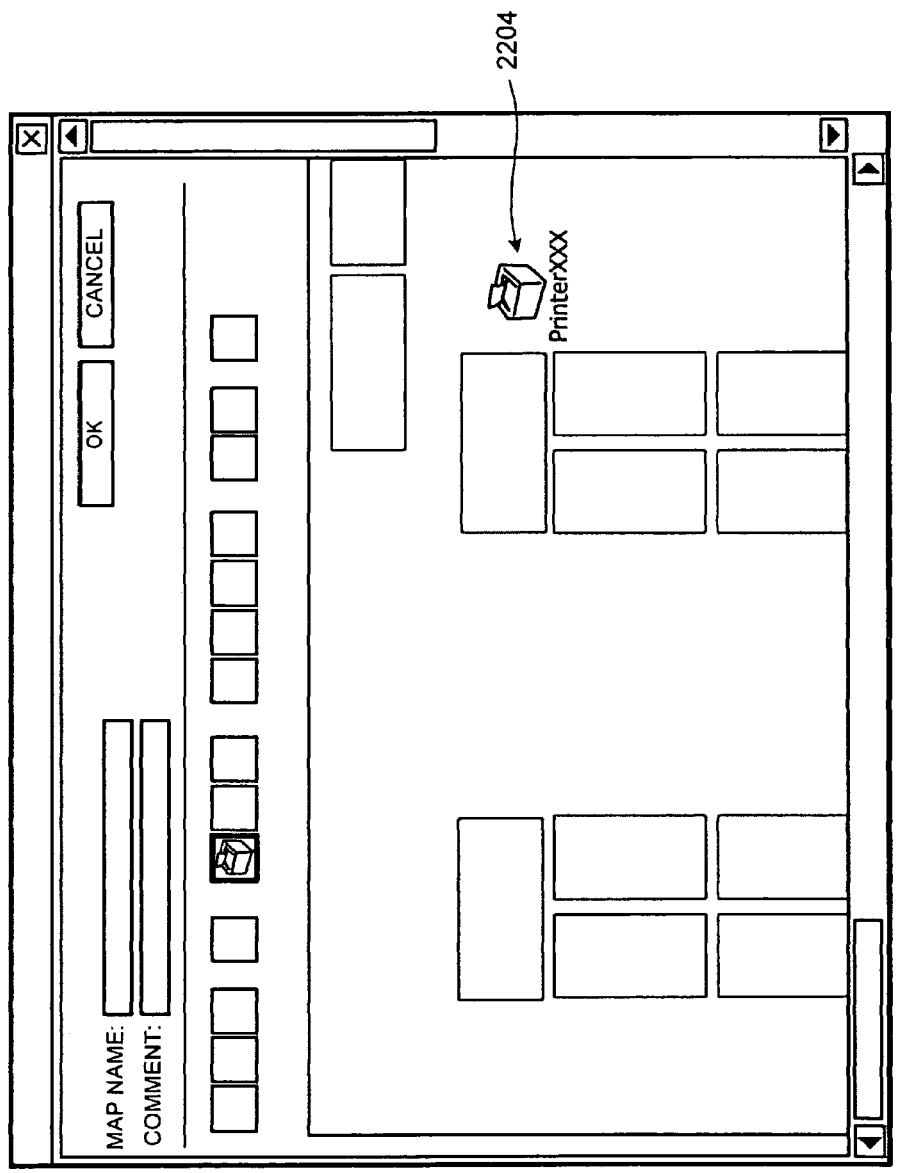
Figure 18D:
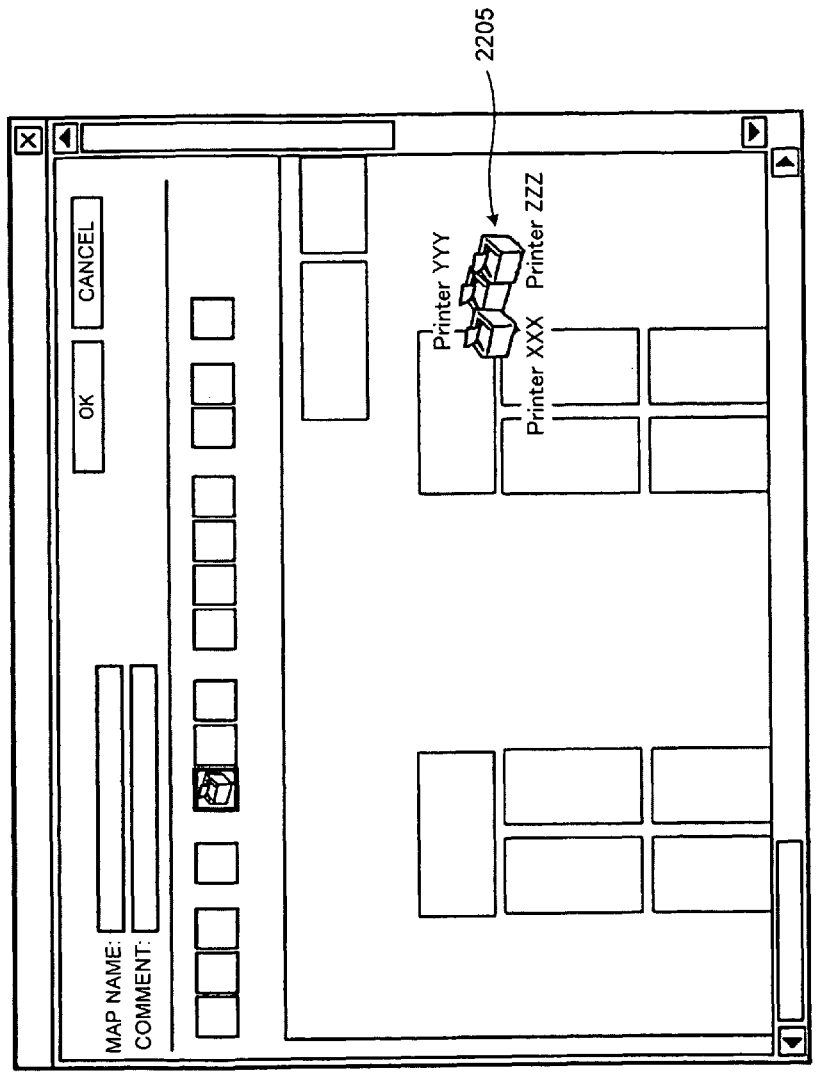
Figure 19A:
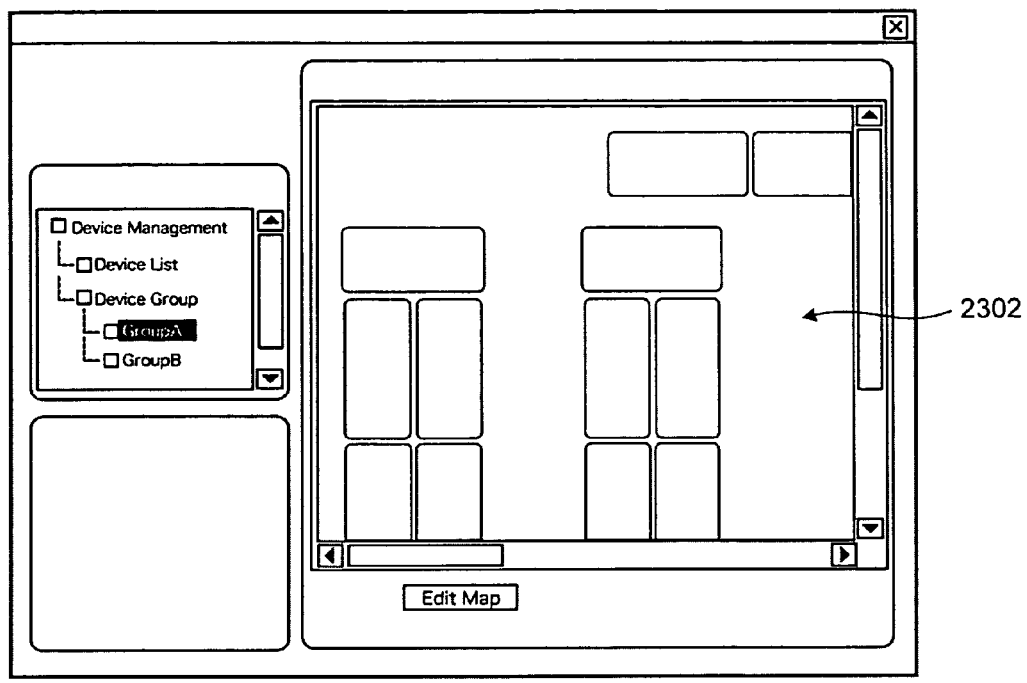
FIGS. 19A to 19D depict a display screen displayed in a device layout map generating process in a device layout generation system according to a second conventional art.
Figure 19B:
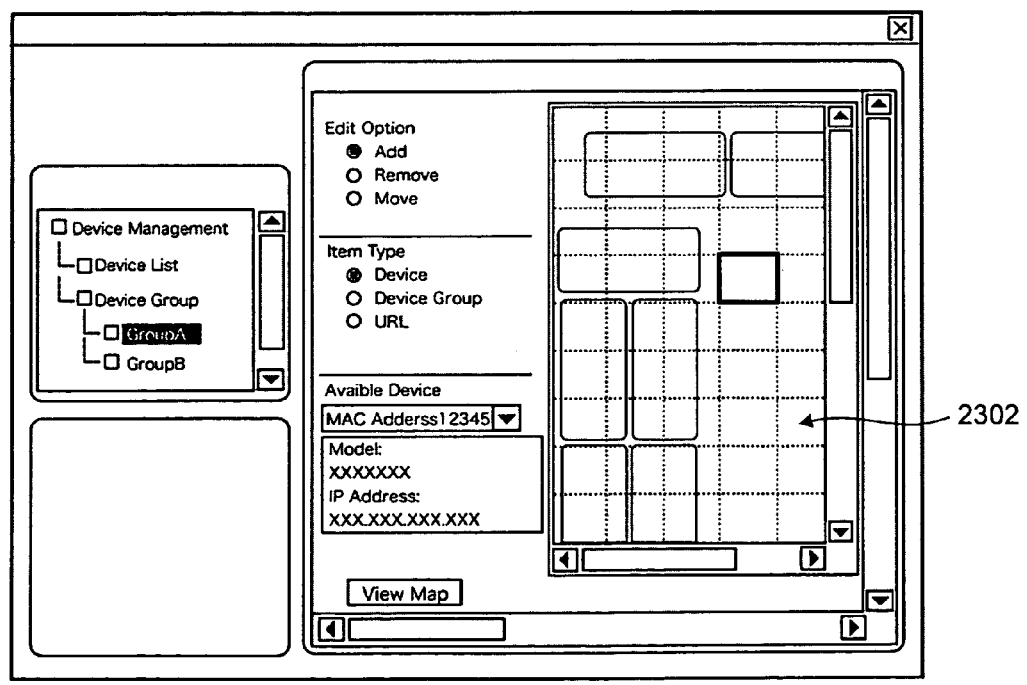
Figure 19C:
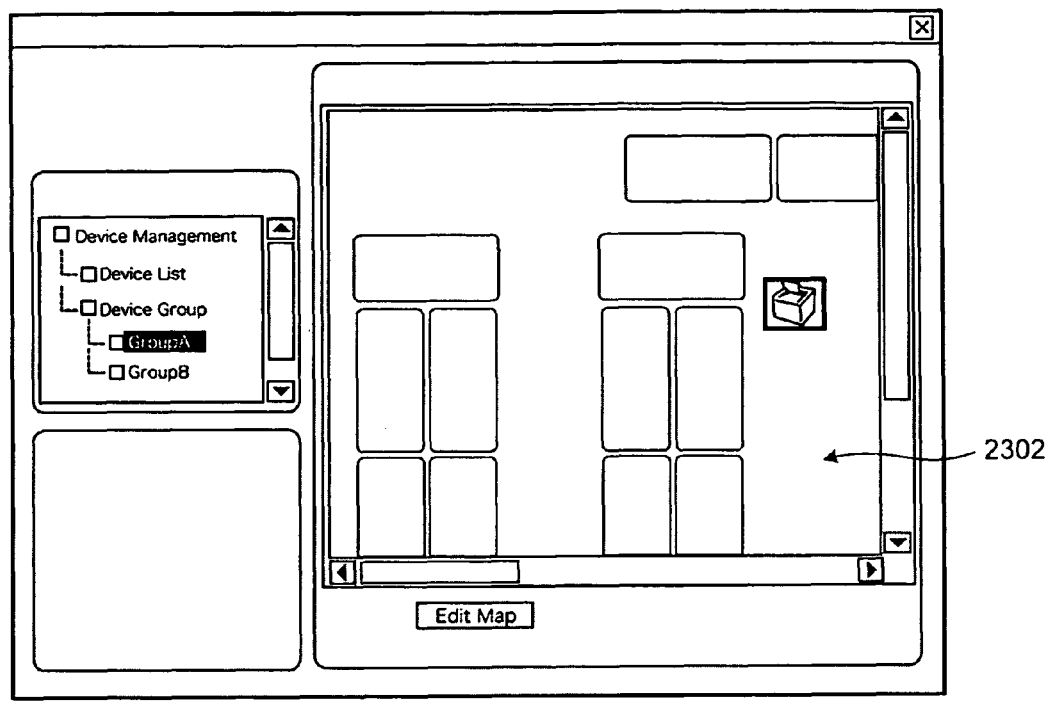
Figure 19D:
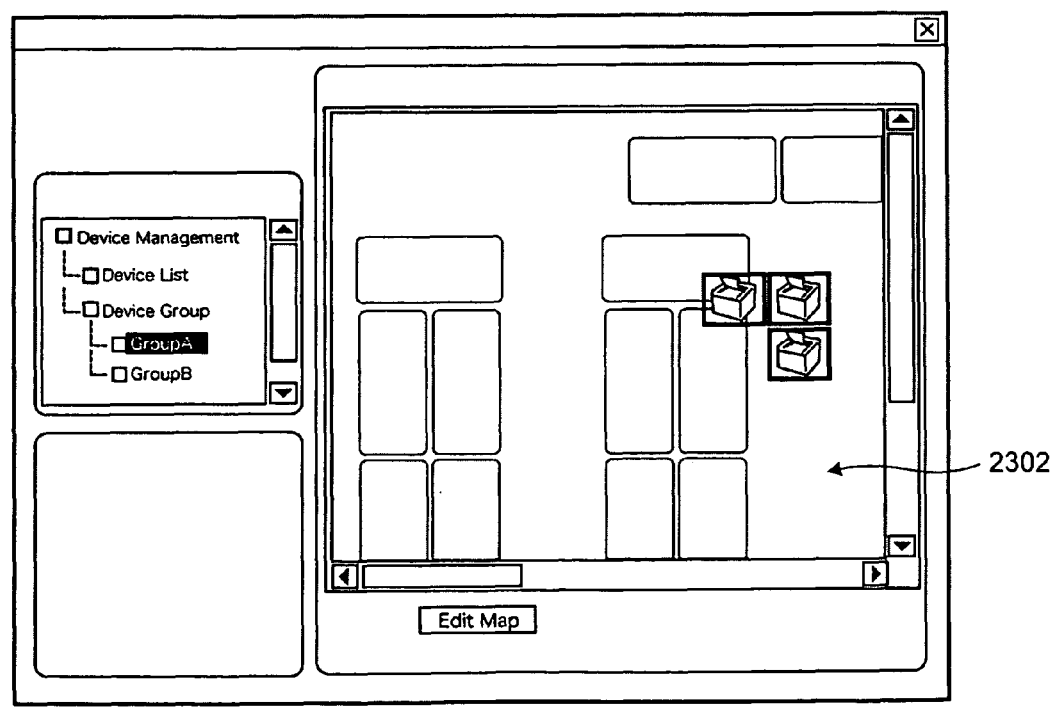

In the first embodiment, the device related data such as "in-house (monochrome) printer P-PRT" is associated with the device icon. By displaying the data specific to the device in correspondence with the device icon on the screen of the device list area, the user can easily ascertain the correspondence between the device icon and the actual input/output device, such that an input/output device having what function is to be arranged in which an installation site as a device icon in the device layout diagram. Further, once the device icon is selected and arranged in the device layout diagram, a desired input/output device to be allocated to the selected device icon does not need to be selected from the device list screen of the input/output devices, associated with the device name and the network address, like the conventional art shown in FIG. 18C. Furthermore, the user does not need to memorize the device name and the network address of the input/output device to be allocated to the selected device icon and to input these on the screen, like the conventional art shown in FIG. 19B. Accordingly, the user's operability when generating the device layout is improved.

A device layout editing process performed by the device layout editing/viewing system according to the first embodiment is explained next. The device layout editing process in the first embodiment is executed by the device-layout managing apparatus 200 on a server side and the device-layout editing/viewing apparatus 300 on the client side.

Figure 7A:
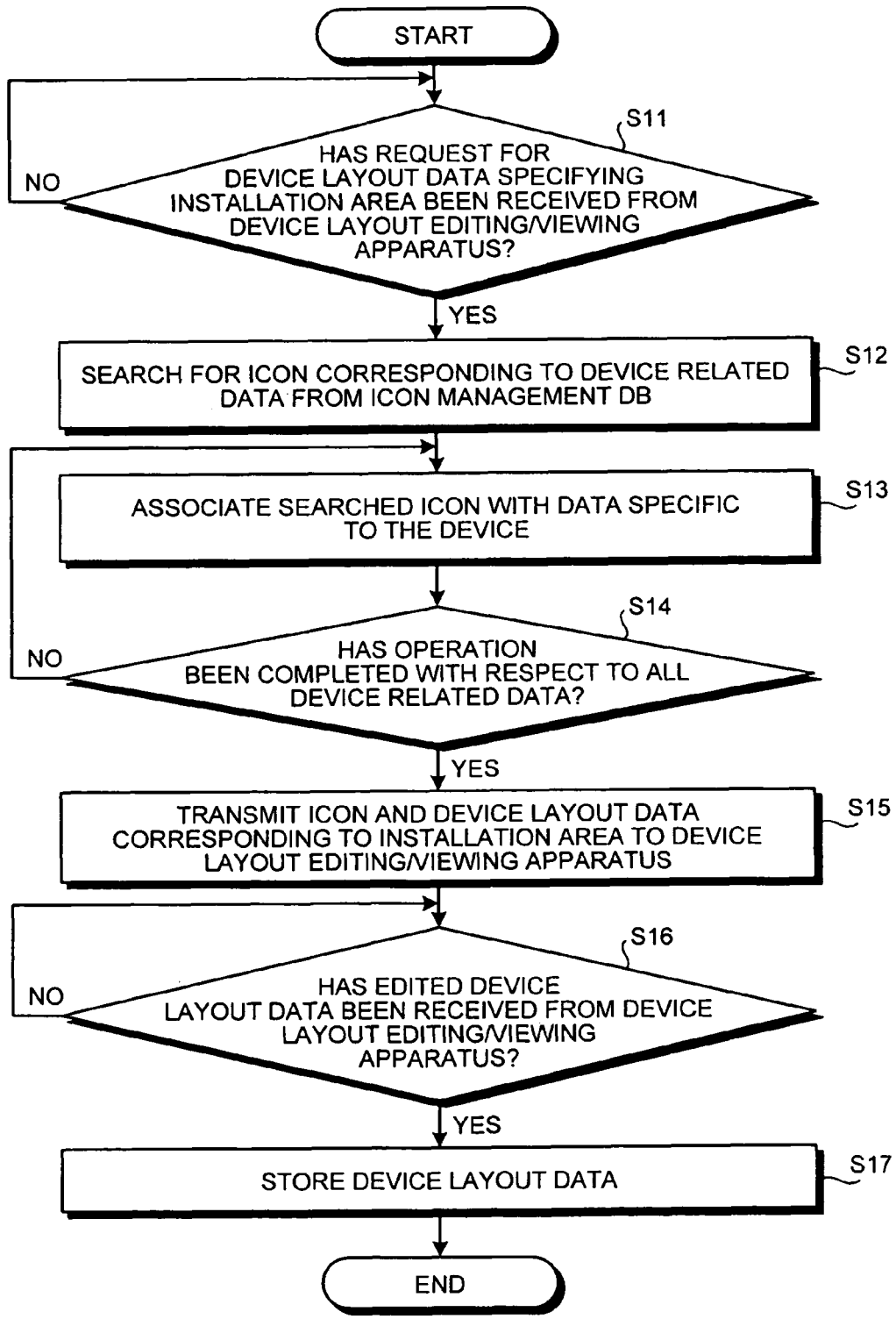
FIG. 7A is a flowchart of a device-layout editing/viewing procedure performed by the device-layout managing apparatus according to the first embodiment.

FIG. 7A is a flowchart of a device layout generation process procedure performed by the device-layout managing apparatus 200 according to the first embodiment. FIG. 7B is a flowchart of a device layout editing process procedure performed by the device-layout editing/viewing apparatus 300 according to the first embodiment.

The device-layout managing apparatus 200 requests the MIB information to the device (the printer 103, the MFP 104, and the like) connected to the network 102 every predetermined time interval by the device-information collecting unit 201, and receives the information specific to the device (the MAC address) and the device related data (information whether it is a printer or an MFP, whether it is color or monochrome, and a manufacturer).

The device-layout editing/viewing apparatus 300 first transmits a request of the device layout data to the device-layout managing apparatus 200 by specifying an installation area by the user (step S21). Upon reception of the request including the specification of the installation area (step S11: Yes), the device-layout managing apparatus 200 searches for a device icon associated with the device related data received from the icon-management database 206, using the device related data as a key, at the time of generating the first device layout diagram (step S12). The searching unit 202 searches for the device icon for each of the device related data.

At the time of generating the first device layout diagram, the device icon searched by the searching unit 202 is associated with the data specific to the device corresponding to the device icon and registered in the device layout data (step S24). In the first embodiment, the device related data corresponding to the device icon is also registered in the device layout data. The process at step S13 is repeated with respect to all device related data corresponding to the searched device icon (step S14: No).

The device-layout managing apparatus 200 reads out the device layout data in the specified installation area from the device-layout database 208, and transmits the data from the device-layout database 208, the searched device icon, and the device related data to the device-layout editing/viewing apparatus 300 (step S15). When existing device layout data is to be edited, not generating the device layout diagram for the first time, processes at steps S12 and S13 are not performed, and the icon registered in the read device layout data is transmitted to the device-layout editing/viewing apparatus 300 together with the device layout data.

In the case of a request for generating the first device layout diagram, the device layout data not including the information such as position specification of the icon is transmitted to the device-layout editing/viewing apparatus 300. Thereafter, the device-layout managing apparatus 200 waits for reception of the edited device layout data from the device-layout editing/viewing apparatus 300 (step S16).

The device-layout editing/viewing apparatus 300 receives the device layout data, the device icon, and the device related data (step S22). The viewing unit 308 then displays the device layout data on the display unit 304 as the device layout diagram (step S23).

FIG. 8 is one example of the device layout diagram displayed on the display screen of the display unit 304. As shown in FIG. 8, when an installation area is specified in a group display column and "edit" is specified by an "edit" tag, an edit mode is displayed.

FIG. 9 is one example of the device layout diagram at the time of editing. As shown in FIG. 9, a device list area 501 is displayed on the left of a map area 802.

The user of the device-layout editing/viewing apparatus 300 performs generating and editing operations of the device layout diagram by using the mouse or the like on the device list area 501 and the map area 802 displayed on the display unit 304, such as moving a device icon from the device list area 501 to a desired position on the map area 802 and arranging the device icon by drag-and-drop operations, enlarging and reducing the size of the arranged device icon, changing the arranged device icon to a balloon shape extending from a position where the device icon is actually arranged, changing the transparency of the device icon, changing the transparency of the map, enlarging and reducing the size of the map area, and deleting the device icon arranged on the map area 802 by returning the device icon from the map area 802 to the device list area 501 by the drag-and-drop operations. The editing unit 302 receives an event from the input unit 305 by the generating and editing operations, and reflects the display by respective operations on the map area 802, thereby performing the generating and editing operations of the device layout diagram (step S24). Such generating and editing operations are performed until the user finishes the generating and editing operations of the device layout diagram and receives a stored event by clicking a "store" button by the mouse or the like (step S25: No).

Figure 10:
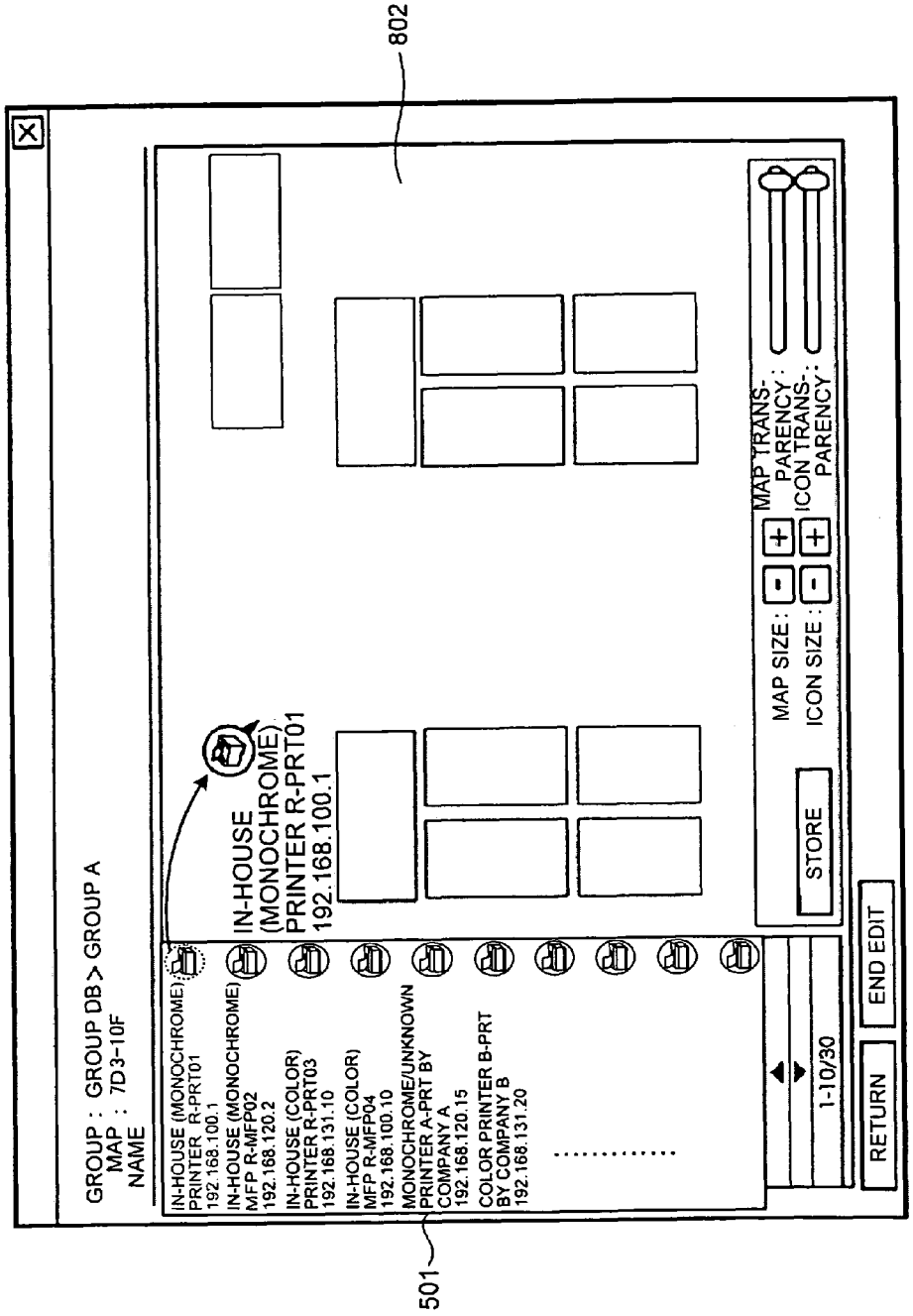
FIGS. 10 to 15 are examples of a state where the device layout diagram is being edited.
Figure 11:
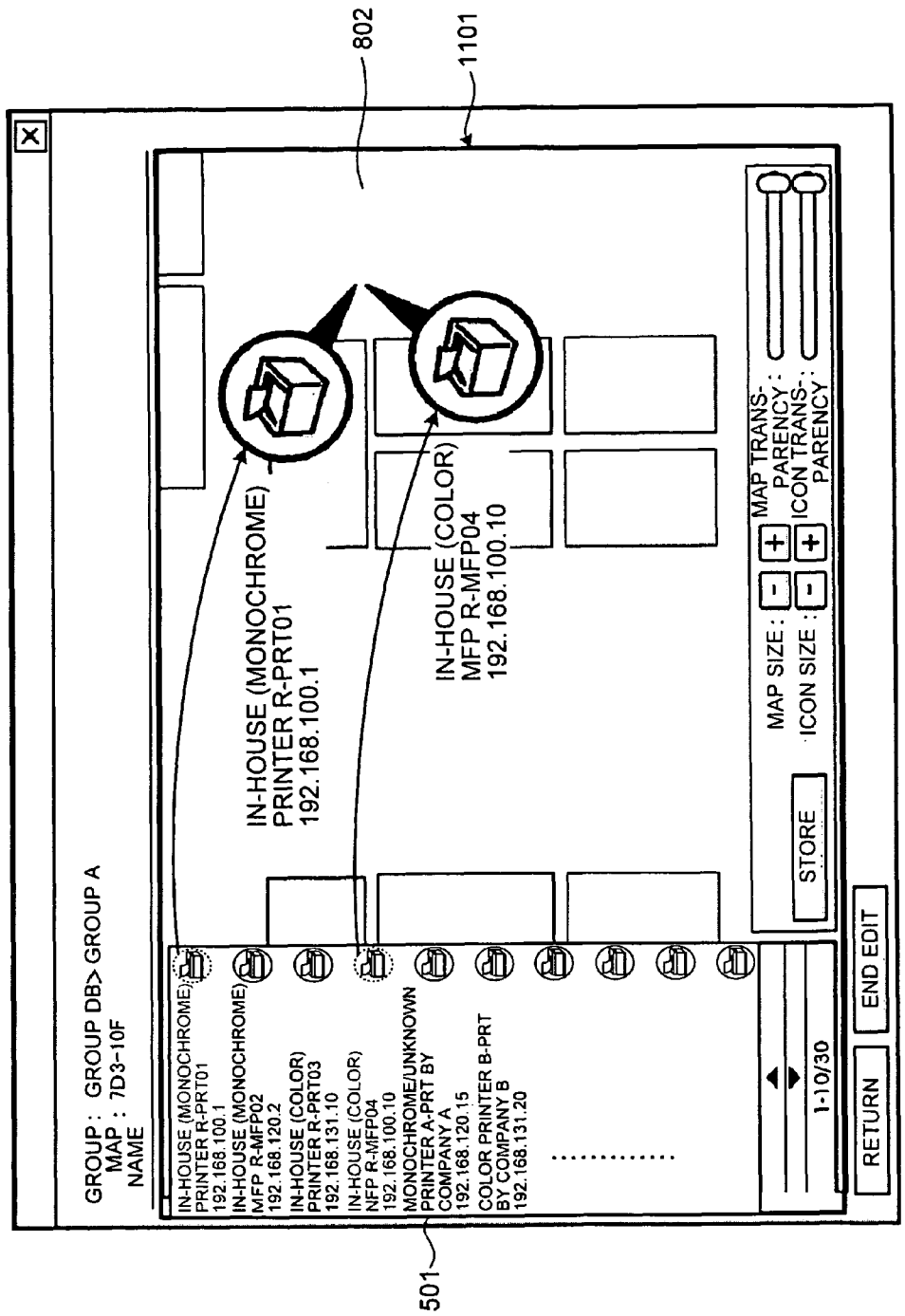

FIGS. 10 and 11 are examples of a state of editing the device layout diagram. As shown in FIGS. 10 and 11, the device icon is arranged by moving the device icon from the device list area 501 to the map area 802 by the drag-and-drop operations. At this time, since the device icon corresponding to the input/output device has already been selected in the device list area 501, a desired input/output device to be allocated to the selected device icon does not need to be selected from the device list screen of the input/output devices, associated with the device name and the network address, like the conventional art shown in FIG. 18C. Furthermore, the user does not need to memorize the device name and the network address of the input/output device to be allocated to the selected device icon and to input these on the screen, like the conventional art shown in FIG. 19B.

In FIG. 11, reference numeral 1101 denotes an area controlled by the Flash technology, and the device list area and the map area are controlled by the Flash technology.

As shown in FIGS. 10 and 11, the device icon is arranged in a balloon shape on the map area 802. Therefore, even if a plurality of input/output devices are set closely in one place, the device icons are not overlapped, as shown in FIG. 11. Accordingly, the device icons are displayed to facilitate editing.

As shown in FIGS. 10 and 11, a "map size" button for specifying an edit size of the device layout diagram, an "icon size" button for specifying the size of the device icon, a bar for specifying the transparency of the map area 802 in the device layout diagram, and a bar for specifying the transparency of the device icon are displayed at the bottom of the screen of the map area 802. By operating respective buttons and bars, the display size of the device layout diagram, the size (enlarge/reduce) of the device icon, the transparency of the map area, and the transparency of the device icon can be specified.

When the user finishes generating and editing operations of the device layout diagram and clicks the "store" button, to receive the stored event by the editing unit 302 (step S25: Yes), the edited content of the device layout diagram is stored as the device layout data, and the communication control unit 303 transmits the device layout data, in which the generating and editing operations have been finished and the device icon is arranged, to the device-layout managing apparatus 200 (step S26).

When the device layout data including the arranged device icon is received from the device-layout editing/viewing apparatus 300 (step S16: Yes), the device-layout managing apparatus 200 stores the received device layout data in the device-layout database 208 (step S17).

The viewing process of the device layout diagram by the device layout editing/viewing system according to the present invention is explained next. With the device-layout editing/viewing apparatus 300, the user selects an installation area to be viewed from a group display on the screen shown in FIG. 8, and clicks "display" button displayed on the screen of the map area 802. Accordingly, the XML format device layout data is read according to the Flash technology, and displayed on the display unit 304.

At this time, the device icon and the map area 802 are displayed in the size, the transparency, the balloon shape, and the color set in the device layout data by the generating and editing process of the device layout diagram.

Figure 12:
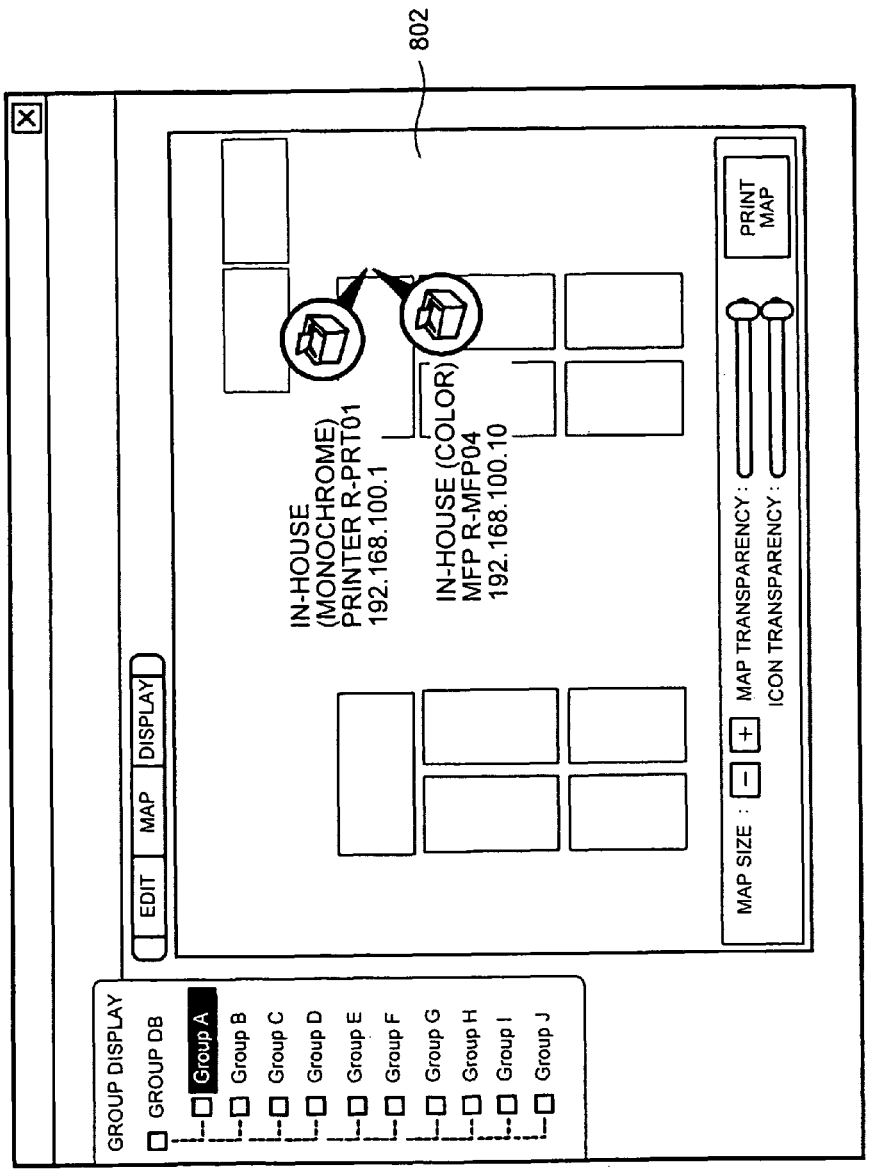
Figure 13:
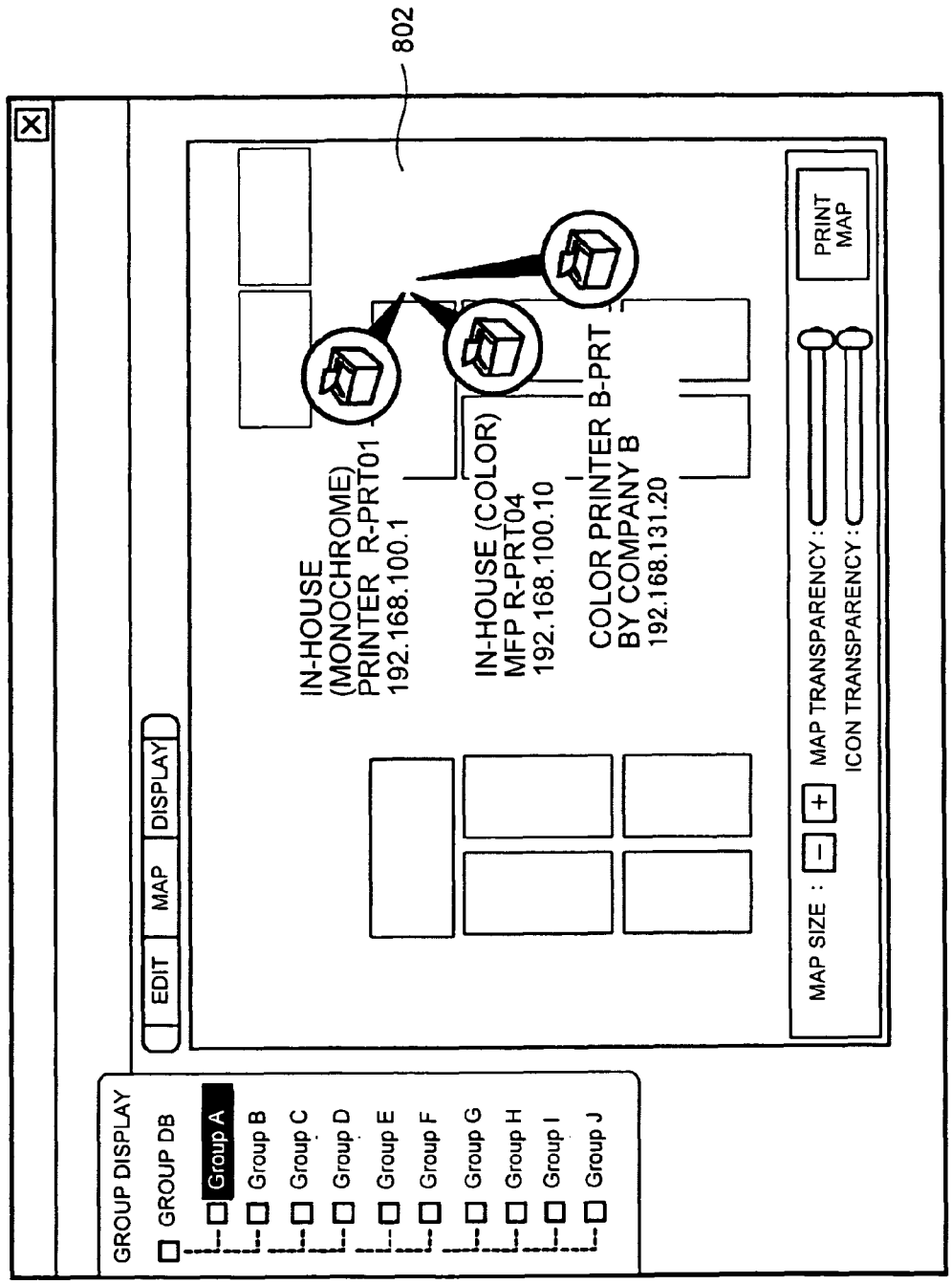
Figure 14:
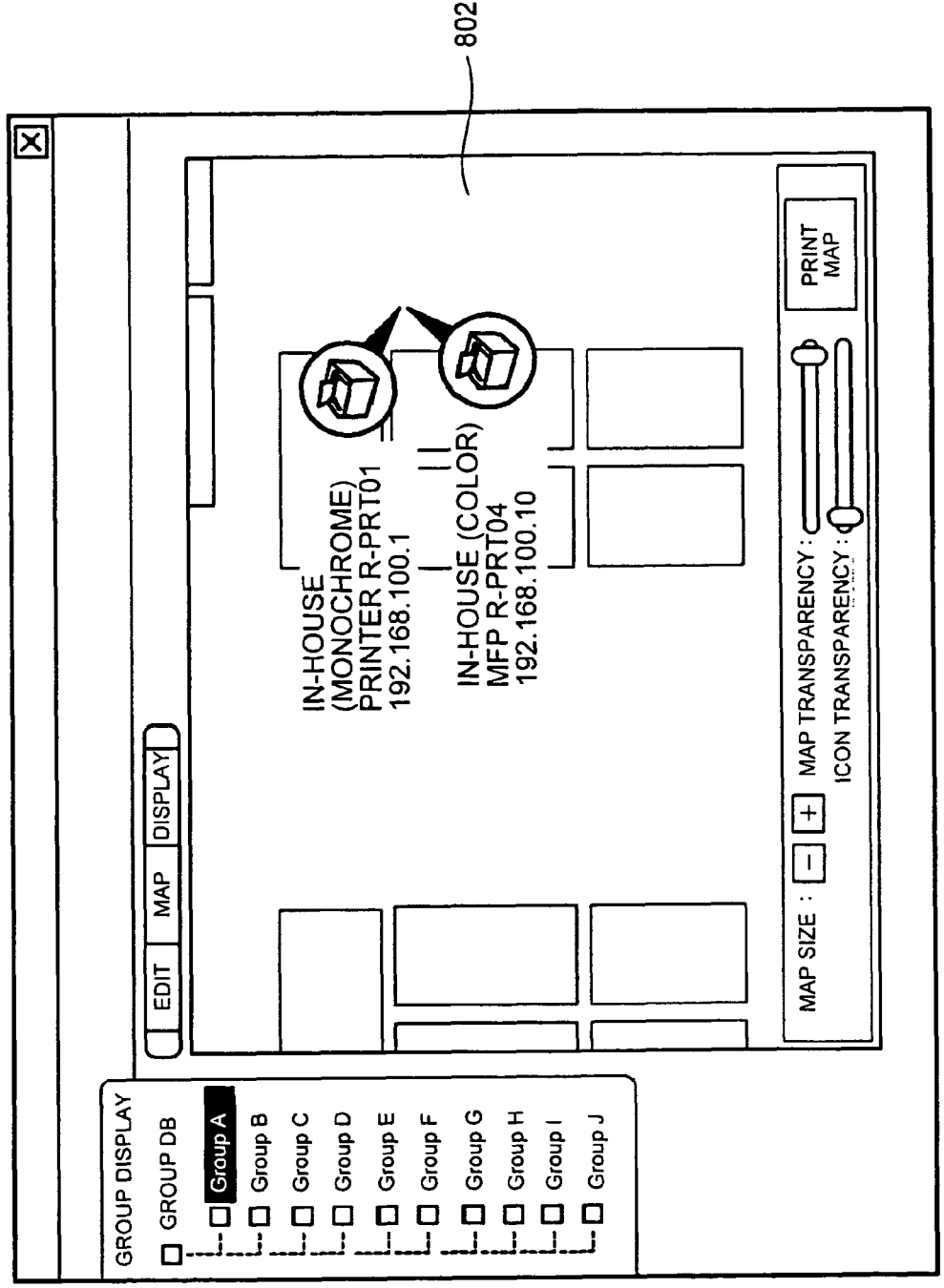
Figure 15:
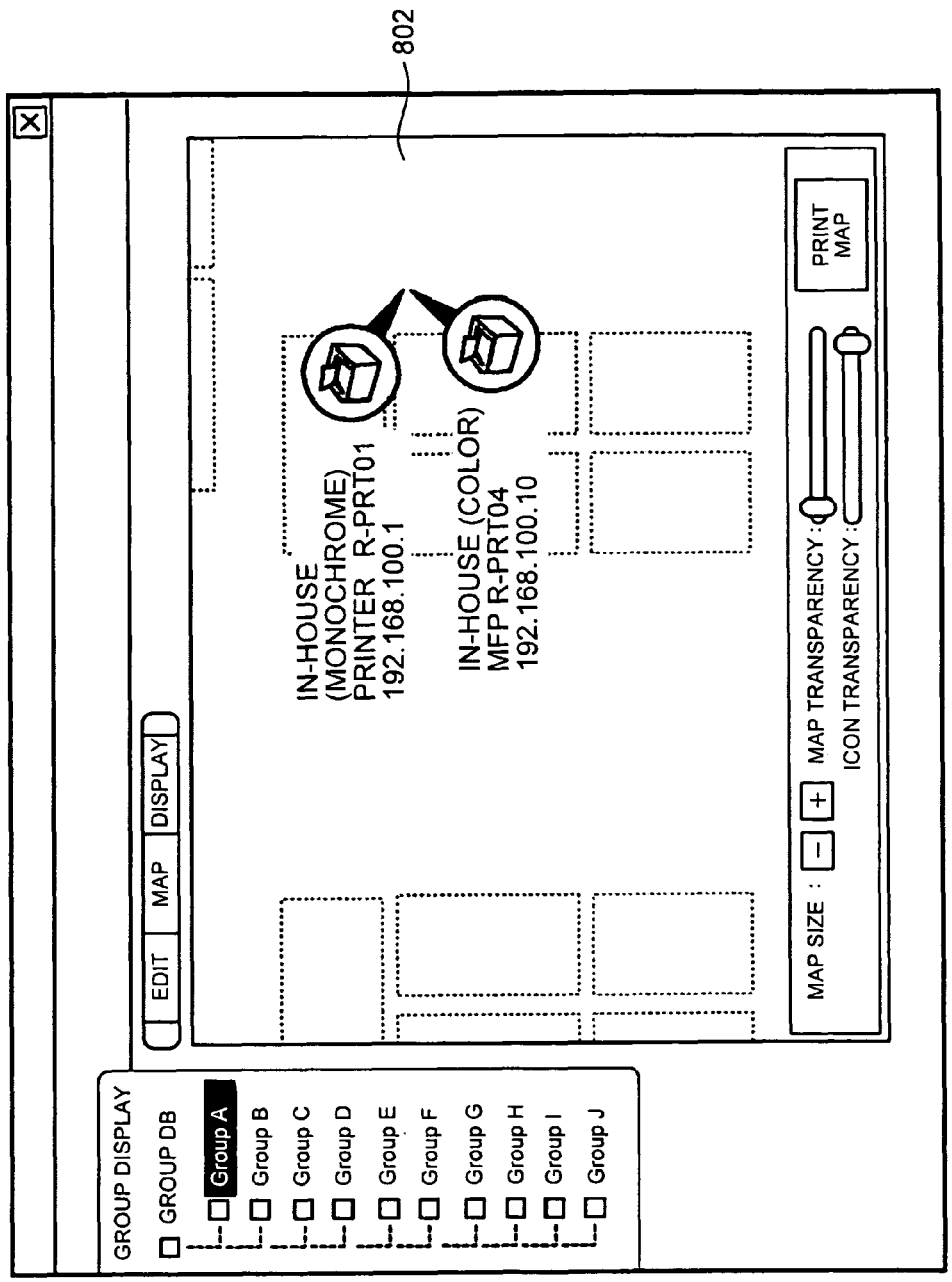

FIGS. 12 to 15 are examples of a state of viewing the device layout diagram. FIG. 12 depicts a viewing state of the device layout diagram when the device layout data is generated and edited by performing the edition shown in FIG. 10. FIG. 13 depicts a viewing state of the device layout diagram when the device layout data is generated and edited by performing the edition shown in FIG. 11. As shown in FIGS. 12 and 13, even when a plurality of input/output devices are set closely in one place, the device icons are displayed without being overlapped on each other, as shown in FIG. 11. FIG. 14 depicts a state where the device layout diagram is displayed in an enlarged mode. FIG. 15 is a display example when the transparency of the map area 802 is increased.

In the first embodiment, since the editing unit 302 and the viewing unit 308 performs edition and viewing of the device layout data by using the Flash technology, following functions can be achieved, as compared to a case that the device layout is edited and viewed by a browser function using Java® or the like.

That is, enlarging and reducing, shifting of only the map area (including an entire screen display enlarged to a maximum size relative to a window size of only the map area), and printing of only the map area can be achieved. Furthermore, at the time of printing of the map area, printing of all device icons registered in the device layout data, that is, printing of the entire map area handled by the device layout data can be achieved, different from printing by the browser function where only the device icon in the area displayed on the display screen can be printed.

Furthermore, different from a conventional apparatus, which enlarges the area for displaying the device icon by enlarging the size of the map area, the device layout diagram (a map image or the like displayed from the device layout data) itself displayed in the map area can be shifted by operating the mouse or the like to change the layout of the device icon displayed in the map area, in a state where the size of the map area is fixed. Accordingly, a scroll bar for shifting the map area does not need to be provided.

In the device layout editing/viewing system according to the first embodiment, the device-layout managing apparatus 200 obtains the device related data and the data specific to the device from a device on the network connecting to the input/output devices, searches for a device icon corresponding to the obtained device related data from the icon-management database, and transmits all the searched device icons to the device-layout editing/viewing apparatus 300. The device-layout editing/viewing apparatus 300 specifies the arrangement of the device icon included in the displayed device list area onto the map area 802 by the drag-and-drop operations, edits the device layout diagram, that is, the device layout data, and transmits the edited device layout data to the device-layout managing apparatus 200. Accordingly, on the device-layout editing/viewing apparatus 300 side, the data specific to the device of the input/output device is displayed in correspondence with the device icon. Therefore, selection of the input/output device and arrangement of the device icon can be specified only by the drag-and-drop operations, making it unnecessary to select the input/output device from the list or the like after the drag-and-drop operations, and facilitating the user's operation for generating the device layout. On the map area 802 displayed by the device-layout editing/viewing apparatus 300, since the device icon can be arranged at an optional position, accurate device layout diagram can be generated.

In the present embodiment, the device-layout editing/viewing apparatus 300 receives the device layout data from the device-layout managing apparatus 200, to generate and edit the device layout diagram, and transmits the edited device layout data to the device-layout managing apparatus 200. However, the device-layout editing/viewing apparatus 300 edits only the position of the device icon and the display mode, and transmits the edited content of the device layout data to the device-layout managing apparatus 200, and the device-layout managing apparatus 200 can reflect the edited content of the device layout data.

While in the first embodiment, the search process of the icon is performed on the device-layout managing apparatus 200 side, the device-layout editing/viewing apparatus 300 side can perform the search process of the icon.

Furthermore, the device layout diagram can be held by the device-layout managing apparatus 200 in an image format, and the device layout diagram in the image format can be transmitted from the device-layout managing apparatus 200 to the device-layout editing/viewing apparatus 300, and the device-layout editing/viewing apparatus 300 can edit the device layout diagram in the image format.

A second embodiment of the present invention is explained next.

In the first embodiment, the device layout diagram is generated by the device layout editing/viewing system including the device-layout managing apparatus and the device-layout editing/viewing apparatus. In the second embodiment, however, a single device-layout editing/viewing apparatus generates the device layout diagram (device layout data).

Figure 16:
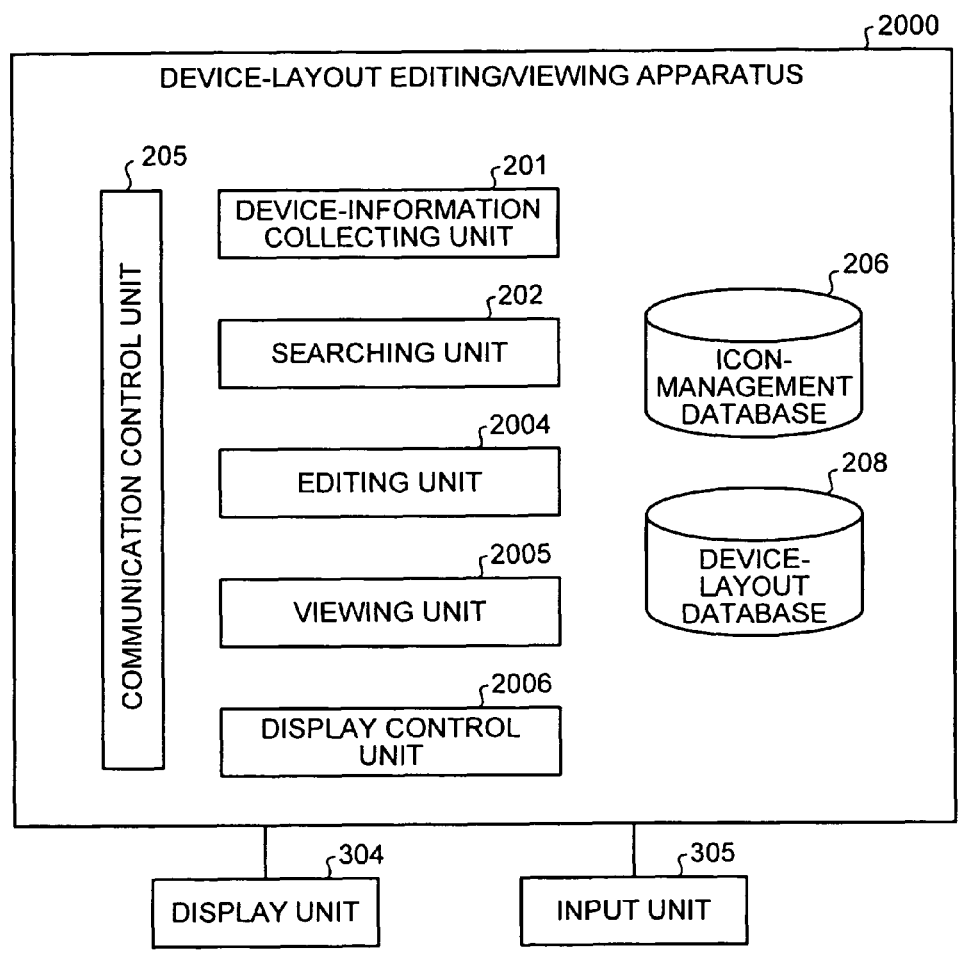
FIG. 16 is a block diagram of a functional configuration of a device-layout editing/viewing apparatus according to a second embodiment of the present invention.

FIG. 16 is a block diagram of a functional configuration of the device-layout editing/viewing apparatus according to the second embodiment. A device-layout editing/viewing apparatus 2000 according to the second embodiment includes, as shown in FIG. 16, the device-information collecting unit 201, the searching unit 202, an editing unit 2004, a viewing unit 2005, a display control unit 2006, the communication control unit 205, the icon-management database 206, the device-layout database 208, the display unit 304, and the input unit 305 such as a pointing device such as a mouse and a keyboard. The device-information collecting unit 201, the searching unit 202, the communication control unit 205, the icon-management database 206, the device-layout database 208, the display unit 304, and the input unit 305 are the same as those in the first embodiment.

The editing unit 2004 displays the device icon and the device layout diagram from the device layout data on the device list area to be able to edit. Other edit functions are the same as in the first embodiment, and also in the second embodiment, the editing unit 2004 manages the XML format-device-layout data based on the Flash technology developed by Adobe®, and displays the device layout data on the display unit 304 as the device layout diagram so as to be able to edit.

The viewing unit 2005 displays the device layout data on the display unit 304 via the display control unit 301. As in the first embodiment, the viewing unit 2005 manages the XML format device-layout data based on the software Flash technology (Flash technology) developed by Adobe®, and displays the device layout diagram on the display unit 304.

Figure 17:
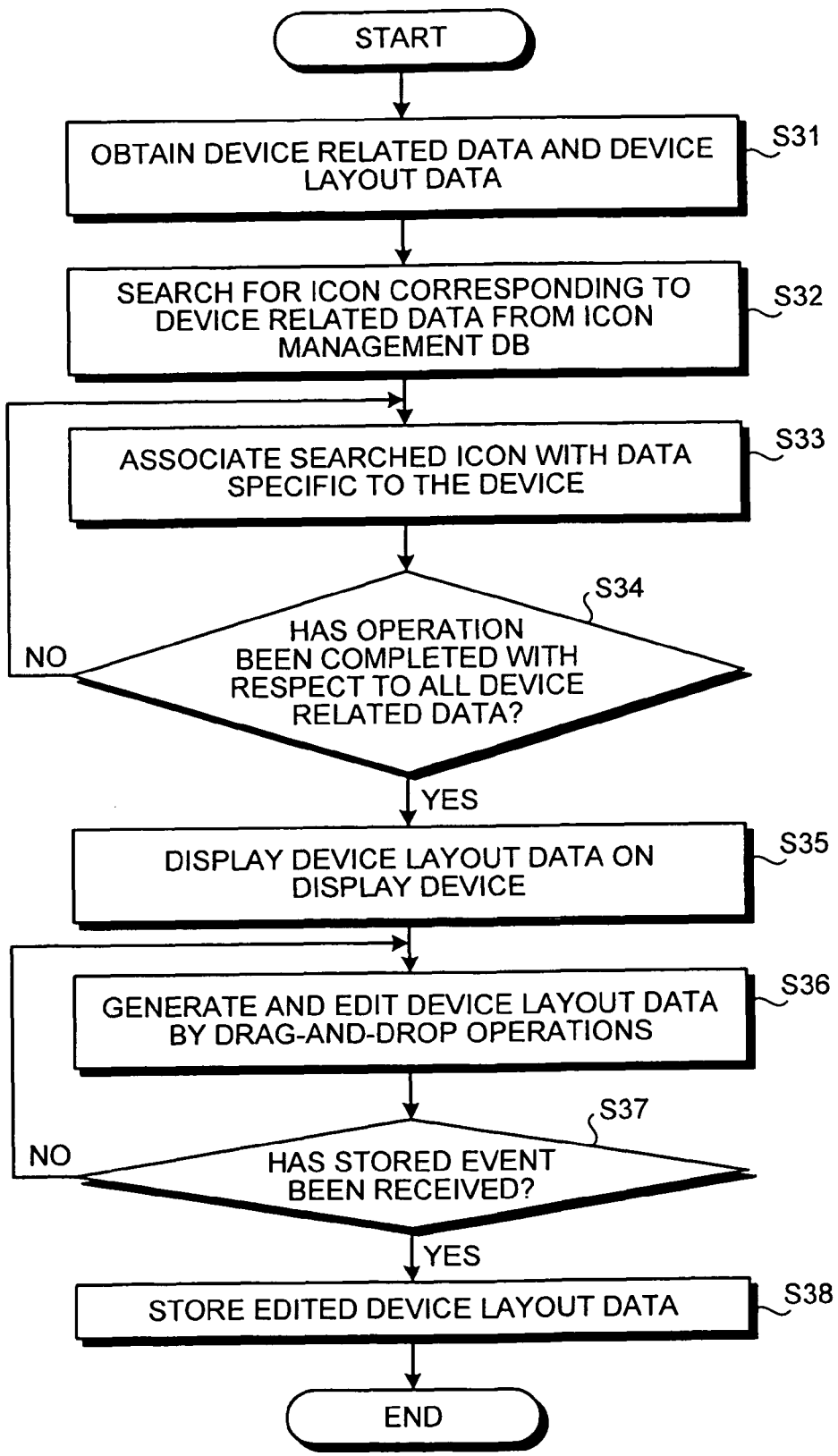
FIG. 17 is a flowchart of a device-layout editing/viewing procedure performed by the device-layout editing/viewing apparatus according to the second embodiment.

The device layout editing process performed by the device-layout editing/viewing apparatus according to the second embodiment is explained. FIG. 17 is a flowchart of a device-layout editing/viewing procedure performed by the device-layout editing/viewing apparatus 2000 according to the second embodiment.

In the second embodiment, in the device-layout editing/viewing apparatus 2000, the device-information collecting unit 201 requests the MIB information to the device (the printer 103, the MFP 104, and the like) connected to the network 102 every predetermined time interval, and receives the information specific to the device (the MAC address) and the device related data (functional information whether it is a printer or an MFP, whether it is color or monochrome, and a manufacturer).

The device-layout editing/viewing apparatus 2000 obtains the received device related data and the device layout data of the specified installation area from the device-layout database (step S31). At the time of initial generation of the device layout diagram, the device-layout editing/viewing apparatus 2000 searches for a device icon associated with the received data specific to the device from the icon-management database 206, using the device related data as a key (step S32).

At the time of initial generation of the device layout diagram, the searching unit 202 registers the searched device icon and the data specific to the device corresponding to the device icon in correspondence with each other in the device layout data (step S33). The process at step S33 is repeated with respect to all device related data corresponding to the searched device icon (step S34: No).

When existing device layout data is to be edited, not generating the device layout diagram for the first time, processes at steps S32 and S33 are not performed, and the icon registered in the read device layout data is obtained from the icon-management database 206.

The viewing unit 2005 then displays the device layout data as a device layout diagram on the display unit 304 (step S35). The displayed device layout diagram is the same as in the first embodiment.

As in the first embodiment, the device-layout editing/viewing apparatus receives various events of editing operation by the user and reflects display by each operation on the map area 802, thereby performing a generating and editing process of the device layout diagram (step S36). The generating and editing process is performed until the user finishes the generating and editing operation of the device layout diagram and receives the stored event by clicking the "store" button by the mouse or the like (step S37: No).

When the user finishes the generating and editing operation of the device layout diagram and receives the stored event by clicking the "store" button (step S37: Yes), the edited content of the device layout diagram is stored as the device layout data (step S38).

The viewing process of the device layout diagram performed by the device-layout editing/viewing apparatus according to the second embodiment is explained next. By using the device-layout editing/viewing apparatus 2000, the user selects an installation area to be viewed from the group display on the screen shown in FIG. 8, and clicks a "display" button displayed on the screen of the map area 802. As a result, the XML format device layout data is read according to the Flash technology, and displayed on the display unit 304.

Also in the second embodiment, since the editing unit 2004 and the viewing unit 2005 uses the Flash technology to edit and view the device layout data, functions that can be achieved are the same as in the first embodiment.

The device-layout editing/viewing apparatus 2000 according to the second embodiment obtains the device related data and the data specific to the device from the network connecting to the input/output devices, searches for a device icon corresponding to the obtained device related data from the icon-management database 206, and displays all the searched device icons and the device layout diagram from the device layout data on the display unit. The device-layout editing/viewing apparatus 2000 then specifies the arrangement of the device icons included in the displayed device list area 501 on the map area 802 by the drag-and-drop operations, and determines the position of the device icons, to generate the device layout diagram. As a result, the information specific to the device of the input/output device and the device icon are displayed in correspondence with each other. Therefore, selection of the input/output device and arrangement of the device icon can be specified only by the drag-and-drop operations, making it unnecessary to select the input/output device from the list or the like after the drag-and-drop operations, and facilitating the user's operation for generating the device layout. On the displayed screen of the map area 802, since the device icon can be arranged at an optional position, accurate device layout diagram can be generated.

The device-layout editing/viewing apparatus and the device-layout managing apparatus according to the first and second embodiments includes a control device such as a central processing unit (CPU), a memory such as a read only memory (ROM) and a random access memory (RAM), an external memory such as an HDD and a compact disk (CD) drive, a display unit such as a display unit, and an input unit such as a keyboard and a mouse, and has a hardware configuration using a general computer.

A device layout editing/viewing program executed by the device-layout editing/viewing apparatus and the device-layout managing apparatus according to the first and second embodiments is stored in a computer readable recording medium such as a CD-ROM, a flexible disk (FD), a CD recordable (CD-R), or a digital versatile disk (DVD) in a file of installable or executable format to be provided.

The device layout editing/viewing program executed by the device-layout editing/viewing apparatus and the device-layout managing apparatus according to the first and second embodiments can be stored on a computer connected to a network such as the Internet, and downloaded via the network. Further, the device layout editing/viewing program executed by the device-layout editing/viewing apparatus and the device-layout managing apparatus can be provided or distributed via the network such as the Internet.

The device layout editing/viewing program executed by the device-layout editing/viewing apparatus and the device-layout managing apparatus according to the first and second embodiments can also be provided by incorporating the program beforehand in a ROM or the like.

The device layout editing/viewing program executed by the device-layout editing/viewing apparatus and the device-layout managing apparatus according to the first and second embodiments has a module configuration including the above respective units (the device-information collecting unit, the searching unit, the editing unit, the viewing unit, the display control unit, and the communication control unit are formed on the main storage unit), and as actual hardware, a CPU (processor) reads out a device layout generating program from the storage medium and executes the program, thereby loading the respective units on the main storage unit, so that the device-information collecting unit, the searching unit, the editing unit, the viewing unit, the display control unit, and the communication control unit are formed on the main storage unit.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for editing and viewing a device-layout, the apparatus comprising:
    a display unit that displays various data;
    a receiving unit that receives, from a device-layout managing apparatus connected to a network, a device icon of an input/output device connected to the network and device layout data including positional information of the device icon;
    a viewing unit that displays a device layout diagram including a device list area in which the device icon is displayed in correspondence with information specific to the input/output device and a map area indicating an installation area of the input/output device on the display unit, based on the received device icon and the received device layout data;
    an input unit that receives a shift operation of the device icon on the device layout diagram from a user;
    an editing unit that edits the device layout diagram by specifying a position of the device icon based on the received shift operation, and generates the device layout data including the positional information of the device icon after a shift from the edited device layout diagram; and
    a transmitting unit that transmits the generated device layout data to the device-layout managing apparatus,
    wherein the editing unit is configured to perform an editing process for editing the device icon on the map area into a balloon shape that extends from an actual position of the device icon, and the viewing unit displays the balloon shaped device icon on the map area, wherein when a plurality of device icons overlap each other at their actual positions, the editing unit edits the plurality of device icons into the balloon shape and the viewing unit displays each of the plurality of balloon shaped device icons such that the plurality of balloon shaped device icons do not overlap each other.

2. The apparatus according to claim 1, wherein the shift operation is to shift the device icon on the device list area to the map area, and the editing unit edits the layout diagram using a position of the shifted device icon on the map area as new positional information.

3. The apparatus according to claim 1, wherein
the shift operation is to shift the device icon on the map area back to the device list area, and
the editing unit edits the layout diagram by deleting the device icon from the map area base on the shift operation.

4. The apparatus according to claim 1, wherein
the shift operation is received by a drag-and-drop operation; and
the editing unit specifies a position specified by the drag-and-drop operation as the position of the device icon.

5. The apparatus according to claim 1, wherein
the editing unit enlarges and reduces the device icon on the map area at an optional magnification.

6. The apparatus according to claim 1, wherein
the editing unit changes transparency of the device icon on the map area.

7. The apparatus according to claim 1, wherein
the editing unit changes a size of the map area.

8. The apparatus according to claim 1, wherein
the editing unit includes a printing unit that prints the map area and the device list area in a separate manner.

9. The apparatus according to claim 1, wherein
the viewing unit displays the device icon on the map area by changing transparency of the device icon.

10. The apparatus according to claim 1, wherein
the viewing unit displays the map area by changing a display mode of the map area.

11. The apparatus according to claim 1, wherein
the viewing unit displays the map area by changing transparency of the map area.

12. The apparatus according to claim 1, wherein
the viewing unit includes a printing unit that prints the map area and the device list area in a separate manner.

13. The apparatus according to claim 1, wherein
the editing unit is configured to perform an editing process for changing a size of the map area without changing a displayed size of the device icon.

14. The method according to claim 2, wherein when the device icon is shifted from the device list area to the map area according to the shift operation, a display appearance of the device icon in the device list area changes to an appearance that indicates that the device icon has been shifted to the map area.

15. A method of editing and viewing a device-layout, the method comprising:
receiving, from a device-layout managing apparatus connected to a network, a device icon of an input/output device connected to the network and device layout data including positional information of the device icon;
displaying a device layout diagram including a device list area in which the device icon is displayed in correspondence with information specific to the input/output device and a map area indicating an installation area of the input/output device on a display unit, based on the received device icon and the received device layout data;
receiving a shift operation of the device icon on the device layout diagram from a user;
editing the device layout diagram by specifying a position of the device icon based on the received shift operation;
generating the device layout data including the positional information of the device icon after a shift from the edited device layout diagram; and
transmitting the generated device layout data to the device-layout managing apparatus, wherein
the editing includes an editing process for editing the device icon on the map area into a balloon shape that extends from an actual position of the device icon, and the displaying displays the balloon shaped device icon on the map area,
wherein when a plurality of device icons overlap each other at their actual positions, the editing edits the plurality of device icons into the balloon shape and the displaying displays each of the plurality of balloon shaped device icons such that the plurality of balloon shaped device icons do not overlap each other.

16. The method according to claim, 15, wherein
the editing includes an editing process for changing a size of the map area without changing a displayed size of the device icon.

17. A computer program product comprising a computer usable medium having computer readable program codes embodied in the medium that when executed causes a computer to execute:
receiving, from a device-layout managing apparatus connected to a network, a device icon of an input/output device connected to the network and device layout data including positional information of the device icon;
displaying a device layout diagram including a device list area in which the device icon is displayed in correspondence with information specific to the input/output device and a map area indicating an installation area of the input/output device on a display unit, based on the received device icon and the received device layout data;
receiving a shift operation of the device icon on the device layout diagram from a user;
editing the device layout diagram by specifying a position of the device icon based on the received shift operation;
generating the device layout data including the positional information of the device icon after a shift from the edited device layout diagram; and
transmitting the generated device layout data to the device-layout managing apparatus, wherein
the editing includes an editing process for editing the device icon on the map area into a balloon shape that extends from an actual position of the device icon, and the displaying displays the balloon shaped device icon on the map area,
wherein when a plurality of device icons overlap each other at their actual positions, the editing edits the plurality of device icons into the balloon shape and the displaying displays each of the plurality of balloon shaped device icons such that the plurality of balloon shaped device icons do not overlap each other.

18. The computer program product according to claim 17, wherein
the editing includes an editing process for changing a size of the map area without changing a displayed size of the device icon.

* * * * *